(12) United States Patent
Kolb et al.

(10) Patent No.: US 8,808,549 B2
(45) Date of Patent: Aug. 19, 2014

(54) METHOD OF MAKING ZIRCONIA-CONTAINING NANOPARTICLES

(71) Applicant: 3M Innovative Properties Company, St. Paul, MN (US)

(72) Inventors: Brant U. Kolb, Afton, MN (US); Danny B. Anderson, North St. Paul, MN (US); Robert S. Davidson, Bloomington, MN (US); Mark J. Hendrickson, Minneapolis, MN (US); James J. Leach, Lakeville, MN (US); Taun L. McKenzie, Hugo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/069,554

(22) Filed: Nov. 1, 2013

(65) Prior Publication Data

US 2014/0056778 A1  Feb. 27, 2014

Related U.S. Application Data

(63) Continuation of application No. 12/810,642, filed as application No. PCT/US2008/087385 on Dec. 18, 2008, now Pat. No. 8,647,510.

(60) Provisional application No. 61/017,326, filed on Dec. 28, 2007.

(51) Int. Cl.
*B01J 19/18* (2006.01)
*C04B 35/626* (2006.01)
*B82Y 30/00* (2011.01)
*C04B 35/486* (2006.01)
*B01J 19/00* (2006.01)
*C01G 25/02* (2006.01)

(52) U.S. Cl.
CPC ...... *B01J 19/0053* (2013.01); *C04B 2235/3225* (2013.01); *C04B 35/6263* (2013.01); *C04B 2235/5454* (2013.01); *C04B 2235/449* (2013.01); *B82Y 30/00* (2013.01); *C04B 35/486* (2013.01); *C04B 2235/72* (2013.01); *C01G 25/02* (2013.01)
USPC ............ 210/741; 210/742; 210/149; 210/175

(58) Field of Classification Search
USPC .......................... 210/741, 742, 149, 175, 660
See application file for complete search history.

(56) References Cited

U.S. PATENT DOCUMENTS 3,058,594 A    10/1962  Hultgren
3,209,034 A *  9/1965  Nishijima et al. ............ 568/476

(Continued)

FOREIGN PATENT DOCUMENTS

JP    2005-179111     7/2005
JP    2005-255450     9/2005

(Continued)

OTHER PUBLICATIONS

Adschiri, "Rapid and Continuous Hydrothermal Crystallization of Metal Oxide Particles in Supercritical Water", J. Am. Ceram. Soc., Apr. 1992, vol. 75, No. 4, pp. 1019-1022.

(Continued)

*Primary Examiner* — Chester Barry
(74) *Attorney, Agent, or Firm* — Jean A. Lown

(57) ABSTRACT

A method of preparing zirconia-containing nanoparticles and a method of preparing a composite material that includes the zirconia-containing nanoparticles are provided. A method of treating a zirconium carboxylate salt solution to remove alkali metal ions and alkaline earth ions is provided. The treated solution can be used as a feedstock to prepare the zirconia-containing nanoparticles. Additionally, a continuous hydrothermal reactor system is provided that can be used, for example, to prepare the zirconia-containing nanoparticles.

18 Claims, 2 Drawing Sheets

(56) References Cited

U.S. PATENT DOCUMENTS

| | | | |
|---|---|---|---|
| 3,432,546 A * | 3/1969 | Bunin et al. | 562/4 |
| 3,484,573 A | 12/1969 | Tingley | |
| 4,358,653 A | 11/1982 | Weiss | |
| 4,639,356 A | 1/1987 | O'Toole | |
| 4,744,802 A | 5/1988 | Schwabel | |
| 4,784,794 A | 11/1988 | Kato | |
| 4,842,739 A | 6/1989 | Tang | |
| 5,037,579 A | 8/1991 | Matchett | |
| 5,453,262 A | 9/1995 | Dawson | |
| 5,468,847 A | 11/1995 | Heilmann | |
| 5,652,192 A | 7/1997 | Matson | |
| 6,264,844 B1 * | 7/2001 | Modell et al. | 210/696 |
| 6,461,732 B1 | 10/2002 | Wittmann | |
| 6,569,533 B1 | 5/2003 | Uchida | |
| 7,833,621 B2 | 11/2010 | Jones | |
| 8,647,510 B2 | 2/2014 | Kolb | |
| 2004/0221507 A1 | 11/2004 | Wu | |
| 2006/0148950 A1 | 7/2006 | Davidson | |
| 2007/0014715 A1 | 1/2007 | Chang | |
| 2007/0128707 A1 | 6/2007 | Rorrer | |
| 2010/0010247 A1 * | 1/2010 | Elst et al. | 554/174 |

FOREIGN PATENT DOCUMENTS

| | | |
|---|---|---|
| JP | 2005-296744 | 10/2005 |
| JP | 2005296744 A * | 10/2005 |
| WO | WO 01/30702 | 5/2001 |
| WO | WO 02/40398 | 5/2002 |
| WO | WO 2013/005445 | 1/2013 |

OTHER PUBLICATIONS

Blumenthal, "The Chemical Behavior of Zirconium," pp. 311-338, D. Van Nostrand Company, Princeton, NJ (1958).

Dawson, "Hydrothermal Synthesis of Advanced Ceramic Powders", Battelle Columbus Div., Columbus, OH 43201, Ceramic Bulletin, 1988, vol. 67, No. 10, pp. 1673-1678.

Hakuta, "Hydrothermal synthesis of zirconia nanocrystals in supercritical water", J. Materials Research Society, Aug. 2004, vol. 19, No. 8, pp. 2230-2234.

Komarneni, "Microwave-Hydrothermal Synthesis of Nanophase Ferrites", Journal of the American Ceramic Society, Nov. 20, 1998, vol. 81, No. 11, pp. 3041-3043.

Ogihara, "Continuous Processing of Monodispersed Titania Powders", Department of Inorganic Materials, Tokyo Institute of Technology, Ookayama, Meguro-ku, Tokyo 152, Japan, J. Am. Ceram. Soc., Sep. 1989, vol. 72, No. 9, pp. 1598-1601.

International Search Report for PCT/US2008/087385, 6 pages.

* cited by examiner

US 8,808,549 B2

METHOD OF MAKING ZIRCONIA-CONTAINING NANOPARTICLES

CROSS REFERENCE TO RELATED APPLICATIONS

This application is a continuation of U.S. application Ser. No. 12/810,642, filed Jun. 25, 2010, now U.S Pat. No. 8,647, 510, which is a national stage filing under 35 U.S.C. 371 of PCT/US2008/087385, filed Dec. 18, 2008, expired, which claims priority to U.S. Provisional Application No. 61/017, 326, filed Dec. 28, 2007, the disclosures of which are incorporated by reference in their entireties herein.

BACKGROUND

Zirconia particles can be added to an organic matrix such as a polymeric material to increase the index of refraction or x-ray opacity of the organic matrix while retaining the optical transmission of the organic matrix. The extent to which the x-ray opacity and/or refractive index of the organic matrix can be increased is dependent on the percent loading of zirconia in the organic matrix and on characteristics of the zirconia particles such as the percent crystallinity, the crystalline structure, the primary particle size, and the degree of association between primary particles.

Crystalline zirconia usually has a higher refractive index and a greater x-ray scattering capability than amorphous zirconium-containing materials. The optical transmission is often a function of the size of the zirconia particles. As the primary particle size increases and/or the degree of association between primary particles increases, the optical transmission can be reduced. The percent loading limit of zirconia particles in an organic matrix material is usually a function of both the extent of particle association and the particle aspect ratio. As the extent of particle association increases, the percent loading limit of the zirconia particles in an organic matrix tends to decrease. Similarly, as the aspect ratio of the zirconia particles increases, the percent loading limit of the zirconia particles in an organic matrix tends to decrease.

SUMMARY

A method of preparing zirconia-containing nanoparticles and a method of preparing a composite material that includes the zirconia-containing nanoparticles are provided. A method of treating a solution containing a dissolved zirconium carboxylate salt is provided. The method of treating removes alkali metal ion and alkaline earth ion impurities from the solution. The treated solution can be used as a feedstock or as part of the feedstock to prepare the zirconia-containing nanoparticles. Additionally, a continuous hydrothermal reactor system is provided that can be used, for example, to prepare the zirconia-containing nanoparticles.

In a first aspect, a method of preparing zirconia-containing nanoparticles is provided. The method includes preparing a feedstock that contains a dissolved zirconium carboxylate salt, wherein the carboxylate or an acid thereof has no greater than 4 carbon atoms. The feedstock has greater than 5 weight percent solids. The method further includes subjecting the feedstock to a single hydrothermal treatment in which at least 90 weight percent of a total amount of the zirconium in the feedstock is converted to zirconia-containing nanoparticles that are crystalline and non-associated.

In a second aspect, a method of preparing a composite material is provided. The method includes preparing zirconia-containing nanoparticles as described above that are crystalline and non-associated. The method further includes suspending or dispersing the zirconia-containing nanoparticles in an organic matrix.

In a third aspect, a method of treating a solution of a zirconium carboxylate salt is provided. The method includes contacting the solution with a cation exchange resin in a hydrogen form. The method further includes sorbing at least 50 mole percent of an alkali metal ion, an alkaline earth ion, or a mixture thereof from the solution onto the cation exchange resin.

In a fourth aspect, a continuous hydrothermal reactor system is provided. The continuous hydrothermal reactor system includes a tubular reactor having an interior surface that contains a fluorinated polymeric material.

BRIEF DESCRIPTION OF THE DRAWINGS

The invention may be more completely understood in consideration of the following detailed description of various embodiments of the invention in connection with the accompanying drawings, in which.

Figure 1:
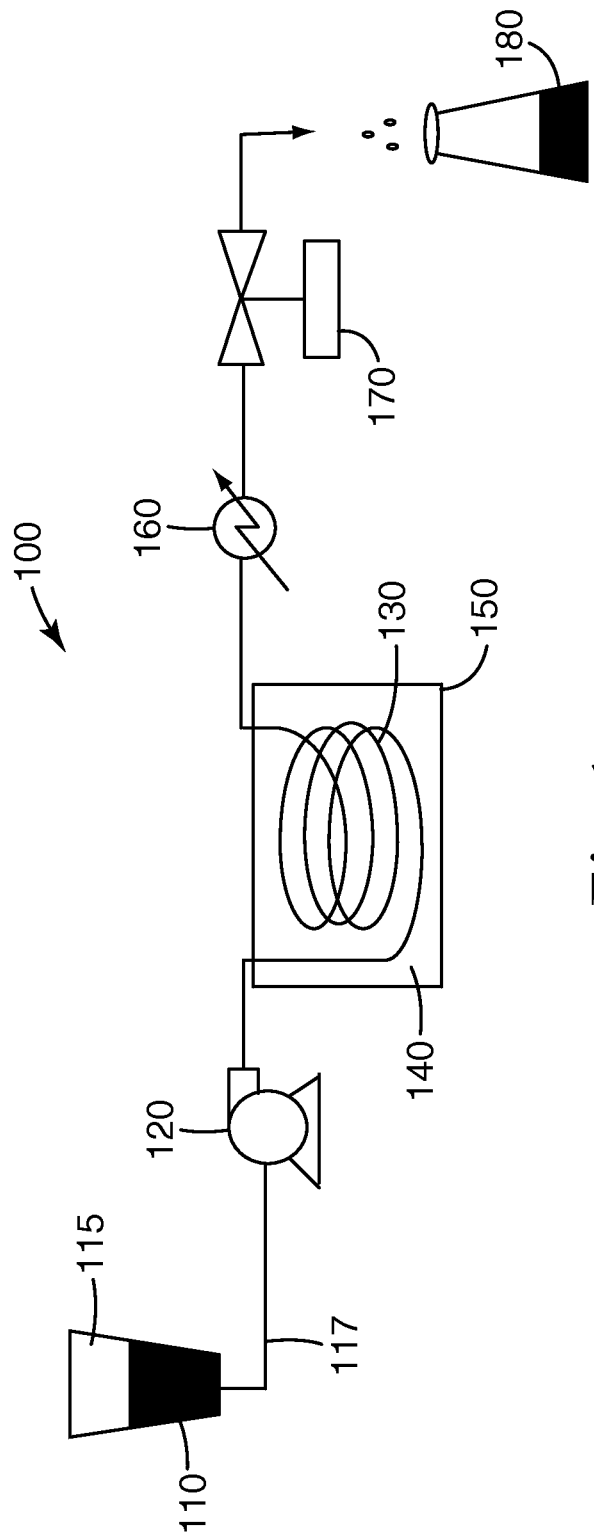
FIG. 1 is a schematic of an exemplary continuous hydrothermal reactor system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Methods of making zirconia nanoparticles and methods of making composite materials that contain the zirconia-containing nanoparticles are described. A feedstock containing a dissolved zirconium carboxylate salt is subjected to a single hydrothermal treatment. The resulting zirconia-containing nanoparticles are typically crystalline and non-associated. The zirconia-containing nanoparticles can be dispersed or suspended in an organic matrix to provide transparent or translucent composite materials having a high index of refraction, a high x-ray opacity, or a combination thereof.

As used herein, the terms "a", "an", and "the" are used interchangeably with "at least one" to mean one or more of the elements being described.

As used herein, the term "associated" refers to a grouping of two or more primary particles that are aggregated and/or agglomerated. Similarly, the term "non-associated" refers to two or more primary particles that are free or substantially free from aggregation and/or agglomeration.

As used herein, the term "aggregation" refers to a strong association of two or more primary particles. For example, the primary particles may be chemically bound to one another. The breakdown of aggregates into smaller particles (e.g., primary particles) is generally difficult to achieve.

As used herein, the term "agglomeration" refers to a weak association of two or more primary particles. For example, the primary particles may be held together by charge or polarity. The breakdown of agglomerates into smaller particles (e.g., primary particles) is less difficult than the breakdown of aggregates into smaller particles.

As used herein, the term "primary particle size" refers to the size of a non-associated single crystal zirconia particle. X-ray Diffraction (XRD) is typically used to measure the primary particle size using the method described herein.

As used herein, the term "hydrothermal" refers to a method of heating an aqueous medium to a temperature above the normal boiling point of the aqueous medium at a pressure that is equal to or greater than the pressure required to prevent boiling of the aqueous medium.

As used herein, the term "zirconia" refers to various stoichiometric formulas for zirconium oxides. The most typical stoichiometric formula is $ZrO_2$, which is also known as zirconium oxide and zirconium dioxide. The zirconia may contain up to 30 weight percent, up to 25 weight percent, up to 20 weight percent, up to 15 weight percent, up to 10 weight percent, or up to 5 weight percent of other chemical moieties such as, for example, yttrium oxide or various organic materials sorbed on the surface.

As used herein, the term "organic matrix" refers to a polymeric material or to a precursor of a polymeric material such as a monomer or oligomer. Stated differently, the organic matrix can be a polymerizable material, a polymerized material, or a mixture thereof.

As used herein, the term "in the range of" includes the endpoints of the range. For example, in the range of 1 to 10 includes the numbers 1, 10, and all numbers between 1 and 10.

In a first aspect, a method of preparing zirconia-containing nanoparticles is provided. Hydrothermal technology is used to prepare the zirconia-containing nanoparticles from a feedstock that contains a dissolved zirconium carboxylate salt. The zirconia-containing nanoparticles are typically crystalline and non-associated.

The carboxylate present in the feedstock has no greater than 4 carbon atoms. Suitable carboxylates include formate, acetate, propionate (i.e., n-propionate), butyrate (i.e., n-butyrate, iso-butyrate, or a mixture thereof), or a combination thereof. Typically, some of the corresponding carboxylic acids of these carboxylates can also be present in the feedstock. That is, the carboxylate and/or an acid thereof in the feedstock has no greater than 4 carbon atoms. As used herein, the phrase "carboxylate and/or acid thereof" means the carboxylate, the corresponding acid of the carboxylate, or a combination thereof.

The feedstock is usually free or substantially free of any carboxylate and/or acid thereof that has greater than 4 carbon atoms. As used herein, the term "substantially free" with reference to a carboxylate and/or acid thereof that has greater than 4 carbon atoms typically means that these materials are not added intentionally to the feedstock but may be present as an impurity in another component of the feedstock such as in the zirconium carboxylate salt. There is typically less 1 mole percent, less than 0.5 mole percent, less than 0.3 mole percent, less than 0.2 mole percent, less than 0.1 mole percent, less than 0.05 mole percent, less than 0.02 mole percent, or less than 0.01 mole percent of these materials present based on the total carboxylates and/or acids thereof in the feedstock. That is, the amount of carboxylate and/or acid thereof having greater than 4 carbon atoms in the feedstock is in the range of 0 to 1 mole percent, in the range of 0 to 0.5 mole percent, in the range of 0 to 0.3 mole percent, in the range of 0 to 0.2 mole percent, in the range of 0 to 0.1 mole percent, in the range of 0 to 0.05 mole percent, in the range of 0 to 0.02 mole percent, or in the range of 0 to 0.01 mole percent based on the total number of moles of carboxylate and/or acid thereof present in the feedstock.

The dissolved salts in the feedstock are zirconium carboxylate salts rather than zirconium halide salts, zirconium oxyhalide salts, zirconium nitrate salts, or zirconium oxynitrate salts. Halide and nitrate anions in the feedstock tend to result in the formation of zirconia-containing nanoparticles that are predominately of a monoclinic phase rather than the more desirable tetragonal or cubic phases. Further, carboxylates and/or acids thereof tend to be more compatible with an organic matrix material compared to halides and nitrates. Many feedstocks are free or substantially free of halides and nitrates. As used herein with reference to halides and nitrates, the term "substantially free" means that halides and nitrates are not intentionally added to the feedstock but may be present as impurities in other components such as in the zirconium carboxylate salt. The feedstock contains no greater than 30 millimolar, no greater than 20 millimolar, no greater than 10 millimolar, no greater than 5 millimolar, no greater than 1 millimolar, or no greater than 0.5 millimolar halide or nitrate. That is, the concentration of halide or nitrate in the feedstock is in the range of 0 to 30 millimolar, in the range of 0 to 20 millimolar, in the range of 0 to 10 millimolar, in the range of 0 to 5 millimolar, in the range of 0 to 1 millimolar, or in the range of 0 to 0.05 millimolar.

The zirconium carboxylate salt is often zirconium acetate salt. Zirconium acetate can be represented by a formula such as $ZrO_{((4-n)/2)}{}^{n+}(CH_3COO^-)_n$ where n is in the range of 1 to 2. The zirconium ion may be present in a variety of structures depending, for example, on the pH of the feedstock. Methods of making zirconium acetate are described, for example, in W. B. Blumenthal, "The Chemical Behavior of Zirconium," pp. 311-338, D. Van Nostrand Company, Princeton, N.J. (1958). Suitable aqueous solutions of zirconium acetate are commercially available, for example, from Magnesium Elektron, Inc. (Flemington, N.J.) that contain up to 17 weight percent zirconium, up to 18 weight percent zirconium, up to 20 weight percent zirconium, up to 22 weight percent, up to 24 weight percent, up to 26 weight percent, or up to 28 weight percent zirconium based on the total weight of the solution.

As prepared from various commercially available sources, the zirconium carboxylate salt solutions often contain some alkali metal ions (e.g., sodium ions, potassium ions, or lithium ions), some alkaline earth ions (e.g., calcium ions, magnesium ions, barium ions, or strontium ions), or a mixture thereof. In many applications, the removal of at least a portion of the alkali metal ions, alkaline earth ions, or both can be desirable. For example, if these ions are present in the feedstock above a certain low amount, the resulting zirconia-containing nanoparticles tend to be associated rather than non-associated. Surprisingly, these ions can be removed from a zirconium carboxylate salt solution by contacting the solution with a cation exchange resin in a hydrogen form. That is, a solution containing a dissolved zirconium carboxylate salt can be contacted with a cation exchange resin in a hydrogen form to remove alkali metal ions, alkaline earth ions, or a mixture thereof. The alkali metal ions and alkaline earth ions can exchange with the hydrogen ions sorbed on the cation exchange resin. These ions (i.e., cations) can displace the hydrogen ions from the cation exchange resin.

It is unexpected that alkali metal ions, alkaline earth ions, or a mixture thereof can be selectively removed from a zirconium carboxylate salt solution. Normally, cation exchange resins are used to remove highly charged cations from a solution by sorbing them onto the cation exchange resin while cations with a lower charge are released back into the solution. It is unexpected that a cation exchange resin would preferentially sorb alkali metal ions or alkaline earth ions that are present in a relatively low concentration compared to zirconium ions, which may be a multivalent ion in solution, that are present in a relatively high concentration. That is, it is surprising that the capacity of the cation exchange resin is not exhausted by the zirconium ions and it is surprising that there is capacity available to sorb alkali metal ions and alkaline earth ions from solution.

In some methods of contacting the zirconium carboxylate salt solution with a cation exchange resin in a hydrogen form, the cation exchange resin can be added directly into the solution. This solution can be the feedstock for the hydrothermal treatment. After removal of at least a portion of the alkali metal ions, alkaline earth ions, or both, the cation exchange resin is separated from the solution. For example, the cation exchange resin can be separated by filtration or centrifugation.

In other methods of contacting the zirconium carboxylate salt solution with a cation exchange resin in a hydrogen form, the cation exchange resin can be placed in a chromatographic column or disposed on the surface of a filtration medium. The filtration medium can be positioned, for example, within a housing to provide a filter cartridge. Suitable filtration medium and systems that include a filter cartridge are further described, for example, in U.S. Pat. No. 5,468,847 (Heilmann et al.). The filtration medium can be in the form of vertical pleated filters such as those described in U.S. Pat. No. 3,058,594 (Hultgren). In other embodiments, the filtration medium is in the form of horizontal, compound radially pleated filters such as those described in U.S. Pat. No. 4,842,739 (Tang et al.).

Enough cation exchange resin in the hydrogen form is typically added to remove at least 50 mole percent of the alkali metal ions, alkaline earths, or both in the zirconium carboxylate solution. In some embodiments, at least 60 mole percent, at least 70 mole percent, at least 80 mole percent, at least 90 mole percent, or at least 95 mole percent of the alkali metal ions, alkaline earth ions, or both are removed by contacting the solution with the cation exchange resin. The amount of cation exchange resin that is contacted with the solution can be calculated from the ionic capacity of the cation exchange resin and the total amount of alkali metal ions and alkaline earth ions dissolved in the solution.

In practice, an excess of the cation exchange resin is contacted with the zirconium carboxylate salt solution. For example, the concentration of the alkali ions and alkaline earth ions in the solution can be determined using a technique such as Inductively Coupled Plasma Atomic Emission Spectroscopy. The capacity of the cation exchange resin is often supplied by the manufacturer but can also be calculated by displacing all of the hydrogen ions in a sample of the cation exchange resin with another ion such as sodium or calcium and then titrating the total amount of hydrogen ions displaced. Based on the capacity of the cation exchange resin and the concentration of alkali metal ions and alkaline earth ions in the zirconium carboxylate salt solution, at least a 10 mole percent excess of the cation exchange resin is contacted with the solution. In many embodiments, the cation exchange resin is present in an excess of at least 20 mole percent, at least 50 mole percent, at least 75 mole percent, at least 100 mole percent, or at least 200 mole percent based on the total amount of alkali metal ions and alkaline earth ions in the zirconium carboxylate salt solution.

Any known cation exchange resin in the hydrogen form can be used. For example, some suitable cation exchange resins are commercially available from Rohm and Haas Company (Philadelphia, Pa.) under the trade designation AMBERLITE such as AMBERLITE IR-120. Other suitable cation exchange resins are commercially available from Dow Chemical (Midland, Mich.) under the trade designation DOWEX such as DOWEX G-26. Still other suitable cation exchange resins are commercially available from Purolite Company (Bala Cynwyd, Pa.) under the trade designation PUROLITE such as PUROLITE C160H. Alternatively, cation exchange resins in a sodium form can be converted to a hydrogen form by contacting them with dilute acids. Any suitable mesh size of the cation exchange resin can be used. In some embodiments, the mesh size is in the range of 16 to 200 mesh, in the range of 16 to 100 mesh, or in the range of 16 to 50 mesh.

In many feedstocks, either with or without treatment of the zirconium carboxylate salt solution with a cation exchange resin in a hydrogen form, the total concentration of alkali metal ions is no greater than 3 milligrams per gram of zirconium. For example, the total concentration of alkali metal ions is often no greater than 2.5 milligrams per gram of zirconium, no greater than 2.0 milligrams per gram of zirconium, no greater than 1.5 milligrams per gram of zirconium, no greater than 1.0 milligram per gram of zirconium, no greater than 0.5 milligrams per gram of zirconium, no greater than 0.3 milligrams per gram of zirconium, no greater than 0.2 milligrams per gram of zirconium, or no greater than 0.1 milligrams per gram of zirconium.

Often, after treatment of the zirconium carboxylate salt solution with a cation exchange resin in a hydrogen form, the total concentration of alkali metal ions in the feedstock is not greater than 1 milligram per gram of zirconium, no greater than 0.6 milligram per gram of zirconium, no greater than 0.5 milligrams per gram of zirconium, no greater than 0.3 milligrams per gram of zirconium, no greater than 0.2 milligrams per gram of zirconium, or no greater than 0.1 milligrams per gram of zirconium.

Similarly, in many feedstocks, either with or without treatment of the zirconium carboxylate salt solution with a cation exchange resin in a hydrogen form, the total concentration of alkaline earth ions is no greater than 3 milligrams per gram of zirconium. For example, the alkaline earth ion content is often no greater than 2.5 milligrams per gram of zirconium, no greater than 2.0 milligrams per gram of zirconium, no greater than 1.5 milligrams per gram of zirconium, no greater than 1.0 milligram per gram of zirconium, no greater than 0.5 milligrams per gram of zirconium, no greater than 0.3 milligrams per gram of zirconium, no greater than 0.2 milligrams per gram of zirconium, or no greater than 0.1 milligrams per gram of zirconium.

Often, after treatment of the zirconium carboxylate salt solution with a cation exchange resin in a hydrogen form, the concentration of alkaline earth ions in the feedstock is not greater than 1 milligram per gram of zirconium, no greater than 0.6 milligrams per gram of zirconium, no greater than 0.5 milligrams per gram of zirconium, no greater than 0.3 milligrams per gram of zirconium, no greater than 0.2 milligrams per gram of zirconium, or no greater than 0.1 milligrams per gram of zirconium.

In applications where the zirconia-containing nanoparticles are suspended or dispersed in an organic matrix, it can be desirable that the total amount of alkali metal ions in the feedstock is less than 0.6 milligrams per gram of zirconium and that the total amount of alkaline earth ions in the feedstock is less than 0.6 milligrams per gram of zirconium. If the total amount of alkali metal ions, alkaline earth ions, or both exceed this amount, there is an increased tendency for the resulting zirconia-containing nanoparticles to be aggregated or agglomerated. In many examples, the total amount of alkali metal ions in the feedstock is less than 0.5 milligrams per gram of zirconium, less than 0.3 milligrams per gram of zirconium, or less than 0.1 milligram per gram of zirconium and the total amount of alkaline earth ions in the feedstock is less than 0.5 milligrams per gram of zirconium, less than 0.3 milligrams per gram of zirconium, or less than 0.1 milligram per gram of zirconium.

Some feedstocks contain a dissolved yttrium salt in addition to the dissolved zirconium carboxylate salt. As with the zirconium carboxylate salt, the anion of the yttrium salt is typically chosen to be removable during subsequent processing steps, to be non-corrosive, and to be compatible with an organic matrix. The yttrium salt is often yttrium carboxylate with the carboxylate having no more than four carbon atoms. In many embodiments, the carboxylate is acetate. The yttrium is often present in an amount up to 20 weight percent based on a total weight of yttrium and zirconium in the feedstock. For example, the yttrium is often present in an amount up to 18 weight percent, up to 15 weight percent, up to 12 weight percent, up to 10 weight percent, up to 8 weight percent, up to 6 weight percent, or up to 4 weight percent based on the total weight of yttrium and zirconium in the feedstock. That is, the amount of yttrium in the feedstock is often in the range of 0 to 20 weight percent, 1 to 20 weight percent, 1 to 18 weight percent, 1 to 10 weight percent, or 1 to 6 weight percent based on the total weight of yttrium and zirconium.

Expressed differently, the weight ratio of yttrium to zirconium (i.e., grams yttrium÷grams zirconium) in the feedstock is often up to 0.25, up to 0.22, up to 0.20, up to 0.16, up to 0.12, up to 0.08. For example, the weight ratio of yttrium to zirconium can be in the range of 0 to 0.25, 0 to 0.22, 0.01 to 0.22, 0.02 to 0.22, 0.04 to 0.22, 0.04 to 0.20, 0.04 to 0.16, or 0.04 to 0.12.

The pH of the feedstock is typically acidic. For example, the pH is usually less than 6, less than 5, or less than 4. The pH often is in the range of 3 to 4.

The liquid phase of the feedstock is typically predominantly water (i.e., the liquid phase is an aqueous based medium). This water is preferably deionized to minimize the introduction of alkali metal ions, alkaline earth ions, or both into the feedstock. Water-miscible organic co-solvents can be included in the liquid phase in amounts up 20 weight percent based on the weight of the liquid phase. Suitable co-solvents include, but are not limited to, 1-methoxy-2-propanol, ethanol, isopropanol, ethylene glycol, N,N-dimethylacetamide, and N-methylpyrrolidone.

Typically, the feedstock is a solution and does not contain dispersed or suspended solids. For example, seed particles usually are not present in the feedstock. The feedstock typically contains greater than 5 weight percent solids and these solids are typically dissolved. As used herein, the "weight percent solids" is calculated by drying a sample at 120° C. and refers the portion of the feedstock that is not water, a water-miscible co-solvent, or another compound that can be vaporized at temperatures up to 120° C. The weight percent solids is equal to $$100(\text{wet weight}-\text{dry weight})\div(\text{wet weight}).$$

In this equation, the term "wet weight" refers to the weight of a feedstock sample before drying and the term "dry weight" refers to the weight of the sample after drying, for example, at 120° C. for at least 30 minutes. If the feedstock has percent solids greater than 5 weight percent, the resulting zirconia-containing nanoparticles are typically non-associated. Surprisingly, however, if the feedstock has percent solids equal to or less than 5 weight percent, the resulting zirconia-containing nanoparticles are typically associated. This is unexpected because the conventional approach to forming non-associated particles is to lower the concentration of the reactants introduced into a hydrothermal reactor.

In many embodiments, the feedstock contains greater than 6 weight percent, greater than 7 weight percent, greater than 8 weight percent, greater than 10 weight percent, greater than 12 weight percent, greater than 14 weight percent, greater than 16 weight percent, greater than 18 weight percent, greater than 20 weight percent solids, or greater than 24 weight percent solids. Some feedstocks contain up to 47 weight percent, which corresponds to concentrations of zirconium acetate that is commercially available. For example, the feedstock can contain up to 45 weight percent, up to 40 weight percent, up to 36 weight percent, up to 32 weight percent, up to 30 weight percent, up to 28 weight percent, up to 25 weight percent, up to 24 weight percent, up to 23 weight percent, or up to 20 weight percent solids. Some exemplary feedstocks have solids in the range of 6 to 47 weight percent, 6 to 40 weight percent, 6 to 37 weight percent, 8 to 36 weight percent, 8 to 30 weight percent, 8 to 24 weight percent, or 8 to 20 weight percent.

Expressed differently, the feedstock typically contains greater than 2.2 weight percent zirconium based on the weight of the feedstock. Some exemplary feedstocks have a zirconium content in the range of 2.6 to 20.7 weight percent, in the range of 2.6 to 16.3 weight percent, in the range of 3.5 to 15.8 weight percent, in the range of 3.5 to 11.0 weight percent, in the range of 3.5 to 10.6 weight percent, or in the range of 3.5 to 8.8 weight percent zirconium based on the weight of the feedstock.

A feedstock containing 5 weight percent solids often contains about 0.36 to 0.42 mmoles carboxylic acid and/or anion thereof per gram of solution, which can correspond to about 2.2 to 2.6 weight percent acetic acid and/or acetate. Similarly a feedstock containing 8 weight percent solids often contains about 0.58 to 0.68 mmoles of carboxylic acid and/or anion thereof per gram of solution, which can correspond to about 3.5 to 4.1 weight percent acetic acid and/or acetate. A feedstock containing 10 weight percent solids often contains about 0.72 to 0.84 mmoles of carboxylic acid and/or anion thereof per gram of solution, which can correspond to about 4.3 to 5.0 weight percent acetic acid and/or acetate. A feedstock containing 17 weight percent solids often contains about 1.22 to 1.42 mmoles of carboxylic acid and/or anion thereof per gram of solution, which can correspond to about 7.3 to 8.5 weight percent acetic acid and/or acetate. A feedstock containing 19 weight percent solids often contains about 1.37 to 1.6 mmoles of carboxylic acid and/or anion thereof per gram of solution, which can correspond to about 8.2 to 9.5 weight percent acetic acid and/or acetate. A feedstock containing 25 weight percent solids often contains about 1.8 to 2.1 mmoles of carboxylic acid and/or anion thereof per gram of solution, which can correspond to about 10.8 to 12.6 weight percent acetic acid and/or acetate. Further, a feedstock containing 45 weight percent solids often contains about 3.2 to 3.7 mmoles of carboxylic acid and/or anion thereof per gram of solution, which can correspond to about 19.4 to 22.4 weight percent acetic acid and/or acetate.

The feedstock is subjected to a single hydrothermal treatment. The dissolved zirconium species in the feedstock undergoes hydrolysis and condensation to form a zirconia-containing nanoparticle. At least 90 weight percent of the dissolved zirconium in the feedstock undergoes hydrolysis and condensation with the single hydrothermal treatment. As used herein, the phrase "single hydrothermal treatment" means that an intermediate is not isolated from the hydrolysis and condensation reaction that is less than 90 weight percent converted to zirconia-containing nanoparticles. The byproducts of the hydrolysis and condensation reactions are usually not removed until at least 90 weight percent of the zirconium in the feedstock has been converted to zirconia-containing nanoparticles. In some embodiments, at least 92 weight percent, at least 95 weight percent, at least 97 weight percent, at least 98 weight percent, at least 99 weight percent, or 100 weight percent of the dissolved zirconium in the feedstock undergoes hydrolysis and condensation during the single hydrothermal treatment.

The percent conversion (i.e., the extent of hydrolysis and condensation) can be calculated, for example, using Thermal Gravimetric Analysis (TGA). The percent conversion of the zirconia-containing sample under analysis can be given by the following equation % Conversion=$100(A-B)/(A-C)$ where A is a percent weight loss of the feedstock, B is a percent weight loss of the zirconia-containing sample under analysis, and C is a percent weight loss of a zirconia-containing standard known or believed to be completely converted. The percent weight loss for the feedstock, the zirconia-containing sample under analysis, and the zirconia-containing standard are determined by drying each sample (e.g., 3 to 6 grams) at 120° C. for 30 minutes before analysis. After equilibration at 85° C. in the thermal gravimetric analyzer, each sample is heated at a rate of 20° C./minute to 200° C. The temperature is held at 200° C. for 20 minutes, increased at a rate of 20° C./minute to 900° C., and held at 900° C. for 20 minutes. The percent weight loss can be calculated from the following equation % weight loss=$100(\text{weight}_{200C}-\text{weight}_{900C})/\text{weight}_{900C}$ for the first feedstock, the zirconia-containing sample under analysis, and the zirconia-containing standard. The percent weight loss corresponds to what is not an inorganic oxide in each of the samples used in the analysis.

Any optional yttrium species in the feedstock can also undergo hydrolysis and condensation along with the zirconium species. The hydrolysis and condensation reactions of the zirconium and the optional yttrium are often accompanied with the release of an acidic byproduct. That is, the byproduct is often a carboxylic acid corresponding to the carboxylate of the zirconium carboxylate salt and any optional yttrium carboxylate salt. For example, if the carboxylate in the salt is formate, acetate, propionate, or butyrate, then the byproduct typically contains formic acid, acetic acid, propionic acid, or butyric acid, respectively.

The single hydrothermal treatment can be in a batch reactor or in a continuous reactor. The heating times are typically shorter and the temperatures are typically higher in a continuous hydrothermal reactor compared to a batch hydrothermal reactor. The time of the hydrothermal treatments can be varied depending on the type of reactor, the temperature of the reactor, and the concentration of the feedstock. The pressure in the reactor can be autogeneous (i.e., the vapor pressure of water at the temperature of the reactor), can be hydraulic (i.e., the pressure caused by the pumping of a fluid against a restriction), or can result from the addition of an inert gas such as nitrogen or argon. Suitable batch hydrothermal reactors are available, for example, from Parr Instruments Co. (Moline, Ill.). Some suitable continuous hydrothermal reactors are described, for example, in U.S. Pat. Nos. 5,453,262 (Dawson et al.) and 5,652,192 (Matson et al.); Adschiri et al., *J. Am. Ceram. Soc.*, 75, 1019-1022 (1992); and Dawson, *Ceramic Bulletin*, 67 (10), 1673-1678 (1988).

If a batch reactor is used for the single hydrothermal treatment to form zirconia-containing nanoparticles, the temperature is often in the range of 160° C. to 275° C., in the range of 160° C. to 250° C., in the range of 170° C. to 250° C., in the range of 175° C. to 250° C., in the range of 175° C. to 225° C., in the range of 180° C. to 220° C., in the range of 180° C. to 215° C., or in the range of 190° C. to 210° C. The feedstock is typically placed in the batch reactor at room temperature. The feedstock within the batch reactor is heated to the designated temperature and held at that temperature for at least 30 minutes, at least 1 hour, at least 2 hours, or at least 4 hours. The temperature can be held up to 24 hours, up to 20 hours, up to 16 hours, or up to 8 hours. For example, the temperature can be held in the range of 0.5 to 24 hours, in the range of 1 to 18 hours, in the range of 1 to 12 hours, or in the range of 1 to 8 hours. Any size batch reactor can be used. For example, the volume of the batch reactor can be in a range of several milliliters to several liters or more.

In many embodiments, the feedstock is passed through a continuous hydrothermal reactor for the single hydrothermal treatment. As used herein, the term "continuous" with reference to the hydrothermal reactor system 100 means that the feedstock 110 is continuously introduced and an effluent is continuously removed from the heated zone. The introduction of feedstock and the removal of the effluent typically occur at different locations of the reactor. The continuous introduction and removal can be constant or pulsed. It is surprising that the feedstock can be passed through a continuous hydrothermal reactor because the feedstock often thickens and forms a gel when heated. Conventional wisdom would suggest that such a feedstock should not be passed through a continuous hydrothermal reactor because of a concern that the material could become too thick to pump or could result in the formation of a plug within the reactor. Conventional wisdom also would suggest that a feedstock with high weight percent solids such as 10 weight percent or 12 weight percent or higher could not be pumped without plugging the reactor system.

One exemplary continuous hydrothermal reactor system 100 is shown schematically in FIG. 1. The feedstock 110 is contained within a feedstock tank 115. The feedstock tank is connected with tubing or piping 117 to a pump 120. Similar tubing or piping can be used to connect other components of the tubular reactor system. The tubing or piping 117 can be constructed of any suitable material such as metal, glass, ceramic, or polymer. The tubing or piping 117 can be, for example, polyethylene tubing or polypropylene tubing in the portions of the continuous hydrothermal reactor system 100 that are not heated and that are not under high pressure. Any tubing that is heated or under pressure is often made of metal (e.g., stainless steel, carbon steel, titanium, nickel, or the like) or has a metal outer housing. The pump 120 is used to introduce the feedstock 110 into the tubular reactor 130. That is, the pump 120 is connected to the inlet of the tubular reactor 130. Any type of pump 120 can be used that is capable of pumping against the pressure within the tubular reactor 130. The pump can provide a constant or pulsed flow of the feedstock solution into the tubular reactor 130.

As used herein, the term "tubular reactor" refers to the portion of the continuous hydrothermal reactor system that is heated (i.e., the heated zone). Although the tubular reactor 130 is shown in FIG. 1 as a coil of tubing, the tubular reactor can be in any suitable shape. The shape of the tubular reactor is often selected based on the desired length of the tubular reactor and the method used to heat the tubular reactor. For example, the tubular reactor can be straight, U-shaped, or coiled. The interior portion of the tubular reactor can be empty or can contain baffles, balls, or other known mixing means.

As shown in FIG. 1, the tubular reactor 130 is placed in a heating medium 140 within a heating medium vessel 150. The heating medium 140 can be, for example, an oil, sand, salt, or the like that can be heated to a temperature above the hydrolysis and condensation temperatures of the zirconium. Suitable oils include, for example, plant oils such as peanut oil and canola oil. Some plant oils are preferably kept under nitrogen when heated to prevent or minimize oxidation of the oils. Other suitable oils include polydimethylsiloxanes such as those commercially available from Duratherm Extended Fluids (Lewiston, N.Y.) under the trade designation "DURATHERM S". Suitable salts include, for example, sodium nitrate, sodium nitrite, potassium nitrate, or mixtures thereof. The heating medium vessel 150 can be any suitable container that can hold the heating medium and that can withstand the heating temperatures used for the tubular reactor 130. The heating medium vessel 150 can be heated using any suitable means. In many embodiments, the heating medium vessel 150 is positioned inside an electrically heated coil. Alternatively, other types of heaters such as, for example, induction heaters, microwave heaters, fuel-fired heaters, heating tape, and steam coils can be used in place of the heating vessel 150, the heating medium 140, or both.

The tubular reactor 130 can be made of any material capable of withstanding the temperatures and pressures used to prepare zirconia nanoparticles. The tubular reactor 130 preferably is constructed of a material that can resist dissolution in an acidic environment. For example, carboxylic acids can be present in the feedstock or can be produced as a reaction byproduct within the continuous hydrothermal reactor system. In some exemplary embodiments, the tubular reactor is made of stainless steel, nickel, titanium, carbon-based steel, or the like.

In other exemplary embodiments, an interior surface of the tubular reactor contains a fluorinated polymeric material. This fluorinated polymeric material can include, for example, a fluorinated polyolefin. In some embodiments, the polymeric material is polytetrafluoroethylene (PTFE) such as TEFLON, which is a trade designation of DuPont (Wilmington, Del.). Some tubular reactors have a fluorinated polymeric hose such as a TEFLON hose within a metal housing such as a braided stainless steel housing. The fluorinated polymeric surface is particularly advantageous for use with feedstocks and/or reaction products that contain carboxylic acids. These carboxylic acids can leach metals from some known hydrothermal reactors such as those constructed of stainless steel.

Surprisingly, the heat transfer is typically sufficient through the fluorinated polymeric material to convert the zirconium in the feedstock to zirconia-containing nanoparticle under continuous hydrothermal conditions. Typical values of the thermal conductivities of 316L stainless steel and PTFE are 18 W/(m K) and 0.25 W/(m K), respectively. When made into tubing, a typical wall thickness of 0.00089 meters for 0.25 inch stainless steel tubing will withstand hydrothermal conditions. This results in a heat-transfer coefficient of 20,000 W/(m$^2$K) for such a stainless steel tube. A typical wall thickness of a 0.25 inch PTFE tube is 0.0010 meters. This results in a heat-transfer coefficient of 250 W/(m$^2$K) for such a tube. The value for the stainless steel tube is 80 times that of the PTFE tube. Since a PTFE tube cannot withstand the pressures of a hydrothermal reaction, it needs to be encased in a sheath, for example stainless steel braiding, designed to contain the pressure. Such a sheath has a typical thickness of 0.0023 meters. Although the resistance to heat transfer of such a braided sheath is difficult to estimate, it will add an amount to the resistance of the PTFE tube itself, making the advantage of the stainless steel tube even greater. Consequently, it is surprising that this type of composite tubing will work in a hydrothermal reactor that requires a considerable ability to exchange energy between the contents of the tube and the external environment.

The second end of the tubular reactor 130 is usually connected to a cooling device 160. Any suitable cooling device 160 can be used. In some embodiments, the cooling device 160 is a heat exchanger that includes a section of tubing or piping that has an outer jacket filled with a cooling medium such as cool water. In other embodiments, the cooling device 160 includes a coiled section of tubing or piping that is placed in a vessel that contains cooling water. In either of these embodiments, the tubular reactor effluent is passed through the section of tubing and is cooled from the tubular reactor temperature to a temperature no greater than 100° C., no greater than 80° C., no greater than 60° C., or no greater than 40° C. Other cooling devices that contain dry ice or refrigeration coils can also be used. After cooling, the reactor effluent can be discharged into a product collection vessel 180. The reactor effluent is preferably not cooled below the freezing point prior to being discharged into the product collection vessel 180.

The pressure inside the tubular reactor can be at least partially controlled with a backpressure valve 170, which is generally positioned between the cooling device 160 and the sample collection vessel 180. The backpressure valve 170 controls the pressure at the exit of the continuous hydrothermal reactor system 100 and helps to control the pressure within the tubular reactor 130. The backpressure is often at least 100 pounds per square inch (0.7 MPa), at least 200 pounds per square inch (1.4 MPa), at least 300 pounds per square inch (2.1 MPa), at least 400 pounds per square inch (2.8 MPa), at least 500 pounds per square inch (3.5 MPa), at least 600 pounds per square inch (4.2 MPa), or at least 700 pounds per square inch (4.9 MPa). The backpressure should be high enough to prevent boiling within the tubular reactor.

The dimensions of the tubular reactor 130 can be varied and, in conjunction with the flow rate of the feedstock, can be selected to provide suitable residence times for the reactants within the tubular reactor. Any suitable length tubular reactor can be used provided that the residence time and temperature are sufficient to convert the zirconium in the feedstock to zirconia-containing nanoparticles. The tubular reactor often has a length of at least 0.5 meter, at least 1 meter, at least 2 meters, at least 5 meters, at least 10 meters, at least 15 meters, at least 20 meters, at least 30 meters, at least 40 meters, or at least 50 meters. The length of the tubular reactor in some embodiments is less than 500 meters, less than 400 meters, less than 300 meters, less than 200 meters, less than 100 meters, less than 80 meters, less than 60 meters, less than 40 meters, or less than 20 meters.

Tubular reactors with a relatively small inner diameter are typically preferred. For example, tubular reactors having an inner diameter no greater than about 3 centimeters are often used because of the fast rate of heating of the feedstock that can be achieved with these reactors. Also, the temperature gradient across the tubular reactor is less for reactors with a smaller inner diameter compared to those with a larger inner diameter. The larger the inner diameter of the tubular reactor, the more this reactor resembles a batch reactor. However, if the inner diameter of the tubular reactor is too small, there is an increased likelihood of the reactor becoming plugged or partially plugged during operation resulting from deposition of material on the walls of the reactor. The inner diameter of the tubular reactor is often at least 0.1 centimeters, at least 0.15 centimeters, at least 0.2 centimeters, at least 0.3 centimeters, at least 0.4 centimeters, at least 0.5 centimeters, or at least 0.6 centimeters. In some embodiments, the diameter of the tubular reactor is no greater than 3 centimeters, no greater than 2.5 centimeters, no greater than 2 centimeters, no greater than 1.5 centimeters, or no greater than 1.0 centimeters. Some tubular reactors have an inner diameter in the range of 0.1 to 3.0 centimeters, in the range of 0.2 to 2.5 centimeters, in the range of 0.3 to 2 centimeters, in the range of 0.3 to 1.5 centimeters or in the range of 0.3 to 1 centimeters.

Rather than increasing the inner diameter of the tubular reactor, it may be preferable to use multiple tubular reactors having a smaller inner diameter arranged in a parallel manner. For example, rather than increasing the inner diameter of the tubular reactor to produce a larger amount of zirconia-containing nanoparticles, multiple tubular reactors having an inner diameter no greater than about 3 centimeters can be operated in a parallel manner.

In a continuous hydrothermal reactor, the temperature and the residence time are selected in conjunction with the tubular reactor dimensions to convert at least 90 weight percent of the zirconium in the feedstock to zirconia-containing nanoparticles using a single hydrothermal treatment. That is, at least 90 weight percent of the dissolved zirconium in the feedstock is converted to zirconia-containing nanoparticles within a single pass through the continuous hydrothermal reactor system.

When referring to a continuous hydrothermal reactor, the term "residence time" means the average length of time that the feedstock is within the heated portion of the continuous hydrothermal reactor system. For the reactor depicted in FIG. 1, the residence time is the average time the feedstock is within the tubular reactor 130 and is equal to the volume of the tubular reactor divided by the flow rate of the feedstock through the tubular reactor. The residence time in the tubular reactor can be varied by altering the length or diameter of the tubular reactor as well as by altering the flow rate of the feedstock. In many embodiments, the residence time is at least 1 minute, at least 2 minutes, at least 4 minutes, at least 6 minutes, at least 8 minutes, or at least 10 minutes. The residence time is typically no greater than 240 minutes, no greater than 180 minutes, no greater than 120 minutes, no greater than 90 minutes, no greater than 60 minutes, no greater than 45 minutes, or no greater than 30 minutes. In many examples, the residence time is in the range of 1 to 240 minutes, in the range of 1 to 180 minutes, in the range of 1 to 120 minutes, in the range of 1 to 90 minutes, in the range of 1 to 60 minutes, in the range of 10 to 90 minutes, in the range of 10 to 60 minutes, in the range of 20 to 60 minutes, or in the range of 30 to 60 minutes.

Any suitable flow rate of the feedstock through the tubular reactor can be used as long as the residence time is sufficiently long to convert the dissolved zirconium to zirconia-containing nanoparticles. That is, the flow rate is often selected based on the residence time needed to convert the zirconium in the feedstock to zirconia-containing nanoparticles. Higher flow rates are desirable for increasing throughput and for minimizing the deposition of materials on the walls of the tubular reactor. A higher flow rate can often be used when the length of the reactor is increased or when both the length and diameter of the reactor are increased. The flow through the tubular reactor can be either laminar or turbulent.

In some exemplary continuous hydrothermal reactors, the reactor temperature is in the range of 170° C. to 275° C., in the range of 170° C. to 250° C., in the range of 170° C. to 225° C., in the range of 180° C. to 225° C., in the range of 190° C. to 225° C., in the range of 200° C. to 225° C., or in the range of 200° C. to 220° C. If the temperature is greater than about 275° C., the pressure may be unacceptably high for some hydrothermal reactors systems. However, if the temperature is less than about 170° C., the conversion of the zirconium in the feedstock to zirconia-containing nanoparticles may be less than 90 weight percent using typical residence times.

The effluent of the hydrothermal treatment (i.e., the product of the hydrothermal treatment) contains zirconia-containing nanoparticles. More particularly, the effluent of the hydrothermal treatment is a zirconia-containing sol. As used herein, the term "sol" refers to a dispersion or suspension of the zirconia-containing nanoparticles in an aqueous-based medium.

In many applications, at least a portion of the aqueous-based medium is removed from the zirconia-containing sol. Any known means for removing the aqueous-based medium can be used. This aqueous-based medium contains water and often contains dissolved carboxylic acids and/or anions thereof that are present in the feedstock or that are byproducts of the reactions that occur within the hydrothermal reactor. As used herein, the term "carboxylic acids and/or anions thereof" refers to carboxylic acids, carboxylate anions of these carboxylic acids, or mixtures thereof. The removal of at least a portion of these dissolved carboxylic acids and/or anions thereof from the zirconia-containing sol may be desirable in some applications. The zirconia-containing sol can be subjected to methods such as vaporization, drying, ion exchange, solvent exchange, diafiltration, or dialysis.

In some embodiments, the effluent of the hydrothermal reactor is concentrated or dried with a drying process. Along with removing at least a portion of the water present in the effluent, the concentration process often results in the vaporization of at least a portion of the dissolved carboxylic acids. Any suitable drying method can be used such as spray drying, gap drying, or oven drying. For example, the effluent can be dried in a conventional oven at a temperature of at least 80° C., at least 90° C., at least 100° C., at least 110° C., or at least 120° C. The drying time is often greater than 1 hour, greater than 2 hours, or greater than 3 hours.

In other embodiments, the effluent of the hydrothermal treatment is subjected to a solvent exchange process. An organic solvent with a higher boiling point than water can be added to the effluent. Examples of organic solvents that are suitable for use in a solvent exchange method include, but are not limited to, 1-methoxy-2-propanol and N-methylpyrrolidone. The mixture containing the effluent plus the organic solvent can be treated to remove the water using methods such as, for example, distillation, rotary evaporation, or oven drying. Often, at least a portion of the dissolved carboxylic acids can be removed along with the water.

In other embodiments, the effluent of the hydrothermal treatment can be subjected to dialysis or diafiltration. Dialysis and diafiltration both tend to remove at least a portion of the dissolved carboxylic acids and/or anions thereof. For dialysis, a sample of the effluent can be positioned within a membrane bag that is closed and then placed within a water bath. The carboxylic acid and/or carboxylate anions diffuse out of the sample within the membrane bag. That is, these species will diffuse out of the effluent through the membrane bag into the water bath to equalize the concentration within the membrane bag to the concentration in the water bath. The water in the bath is typically replaced several times to lower the concentration of species within the bag. A membrane bag is typically selected that allows diffusion of the carboxylic acids and/or anions thereof but does not allow diffusion of the zirconia-containing nanoparticles out of the membrane bag.

For diafiltration, a permeable membrane is used to filter the sample. The zirconia particles can be retained on the filter if the pore size of the filter is appropriately chosen. The dissolved carboxylic acids and/or anions thereof pass through the filter. Any liquid that passes through the filter is replaced with fresh water. In a discontinuous diafiltration process, the sample is often diluted to a pre-determined volume and then concentrated back to the original volume by ultrafiltration. The dilution and concentration steps are repeated one or more times until the carboxylic acid and/or anions thereof are removed or lowered to an acceptable concentration level. In a continuous diafiltration process, which is often referred to as a constant volume diafiltration process, fresh water is added at the same rate that liquid is removed through filtration. The dissolved carboxylic acid and/or anions thereof are in the liquid that is removed.

In yet another embodiment, the effluent of the hydrothermal treatment can be contacted with an anion exchange resin in a hydroxyl form. By adjusting the pH of the effluent, the carboxylic acids can be converted to the basic form (i.e., carboxylate anion). At least some of the carboxylate anions can replace some of the hydroxyl ions on the anion exchange resin. The pH adjusted effluent can be passed through a column containing the anion exchange resin or through a filtration medium that includes the anion exchange resin. Alternatively, the anion exchange resin can be mixed with the effluent of the continuous hydrothermal reactor. After ion exchange, the anion exchange resin can be removed by filtration. The size of the anion exchange resin is selected so that it can be easily filtered from the treated effluent. For example, the size of the anion exchange resin is often no less than 200 mesh, no less than 100 mesh, or no less than 50 mesh.

The zirconia-containing nanoparticles can optionally contain yttrium. Any yttrium that is present is typically in the form of yttrium oxide. The presence of yttrium in the zirconia-containing nanoparticle usually facilitates the formation of the cubic/tetragonal phases rather than the monoclinic phase. The cubic and tetragonal phases are often preferred because they tend to have a higher refractive index and x-ray opacity compared to the monoclinic phase. These phases also tend to be more symmetrical, which can be an advantage in some applications when the zirconia-containing nanoparticles are suspended or dispersed in an organic matrix because they have a minimal effect on the viscosity of the organic matrix. Additionally, the percent loading can be higher with the cubic and tetragonal phases.

The mole ratio of yttrium to zirconium (i.e., moles yttrium÷moles zirconium) in the zirconia-containing nanoparticles is often up to 0.25, up to 0.22, up to 0.20, up to 0.16, up to 0.12, up to 0.08. For example, the mole ratio of yttrium to zirconium can be in the range of 0 to 0.25, 0 to 0.22, 0.01 to 0.22, 0.02 to 0.22, 0.04 to 0.22, 0.04 to 0.20, 0.04 to 0.16, or 0.04 to 0.12.

Expressed differently as oxides, the zirconia-containing nanoparticles often contain up to 11 mole percent $Y_2O_3$ based on the moles of the inorganic oxides (i.e., $Y_2O_3$ plus $ZrO_2$). For example, the zirconia-containing nanoparticles can contain up to 10 mole percent, up to 8 mole percent, up to 6 mole percent, or up to 4 mole percent $Y_2O_3$ based on the moles of the inorganic oxides. Some zirconia-containing nanoparticles contain 0 to 11 mole percent, 0 to 10 mole percent, 1 to 10 mole percent, 1 to 8 mole percent, or 2 to 8 mole percent $Y_2O_3$ based on the moles of the inorganic oxides.

Expressed in yet another manner, the zirconia-containing nanoparticles often contain up to 20 weight percent $Y_2O_3$ based on the weight of the inorganic oxides (i.e., $Y_2O_3$ plus $ZrO_2$). For example, the zirconia-containing nanoparticles can contain up to 18 weight percent, up to 16 weight percent, up to 12 weight percent, up to 10 weight percent, or up to 6 weight percent $Y_2O_3$ based on the weight of the inorganic oxides. Some zirconia-containing nanoparticles contain 0 to 20 weight percent, 0 to 18 weight percent, 2 to 18 weight percent, 2 to 16 weight percent, or 2 to 10 weight percent $Y_2O_3$ based on the weight of the inorganic oxides.

The zirconia-containing nanoparticles often contain at least some organic material in addition to inorganic oxides. The organic material can be attached to the surface of the zirconia particles and often originates from the carboxylate species (anion, acid, or both) included in the feedstock or formed as a byproduct of the hydrolysis and condensation reactions. That is, the organic material is often sorbed to the surface of the zirconia-containing nanoparticles. The zirconia particles often contain up to 15 weight percent, up to 12 weight percent, up to 10 weight percent, up to 8 weight percent, or up to 6 weight percent organic material based on the weight of the particles.

The zirconia-containing nanoparticles often contain less than 3 milligrams of an alkali metal such as sodium, potassium, or lithium per gram of zirconium in the nanoparticles. For example, the amount of alkali metal can be less than 2 milligrams per gram of zirconium, less than 1 milligram per gram of zirconium, less than 0.6 milligram per gram of zirconium, less than 0.5 milligram per gram of zirconium, less than 0.3 milligram per gram of zirconium, less than 0.2 milligrams per gram of zirconium, or less than 0.1 milligram per gram of zirconium.

Likewise, the zirconia-containing nanoparticles often contain less than 3 milligrams of an alkaline earth such as calcium, magnesium, barium, or strontium per gram of zirconium in the nanoparticles. For example, the amount of alkaline earth can be less than 2 milligrams per gram of zirconium, less than 1 milligram per gram of zirconium, less than 0.6 milligram per gram of zirconium, less than 0.5 milligram per gram of zirconium, less than 0.3 milligrams per gram of zirconium, less than 0.2 milligrams per gram of zirconium, or less than 0.1 milligram per gram of zirconium.

The effect of alkali metal ions and alkaline earth ions in the feedstock can be seen in the appearance of the effluent from the hydrothermal reactor. If the amount of alkali metal ions or alkaline earth ions in the feedstock is relatively high, the zirconia-containing sol tends to look hazy rather than clear. Further, composite materials that are formed from effluents that appear hazy often have a higher relative viscosity compared to composite materials that are prepared from effluents that appear clear. That is, the presence of alkaline metal ions, alkaline earth ions, or both in the feedstock used to prepare the zirconia-containing nanoparticles can affect the viscosity of the composite materials.

Figure 3:
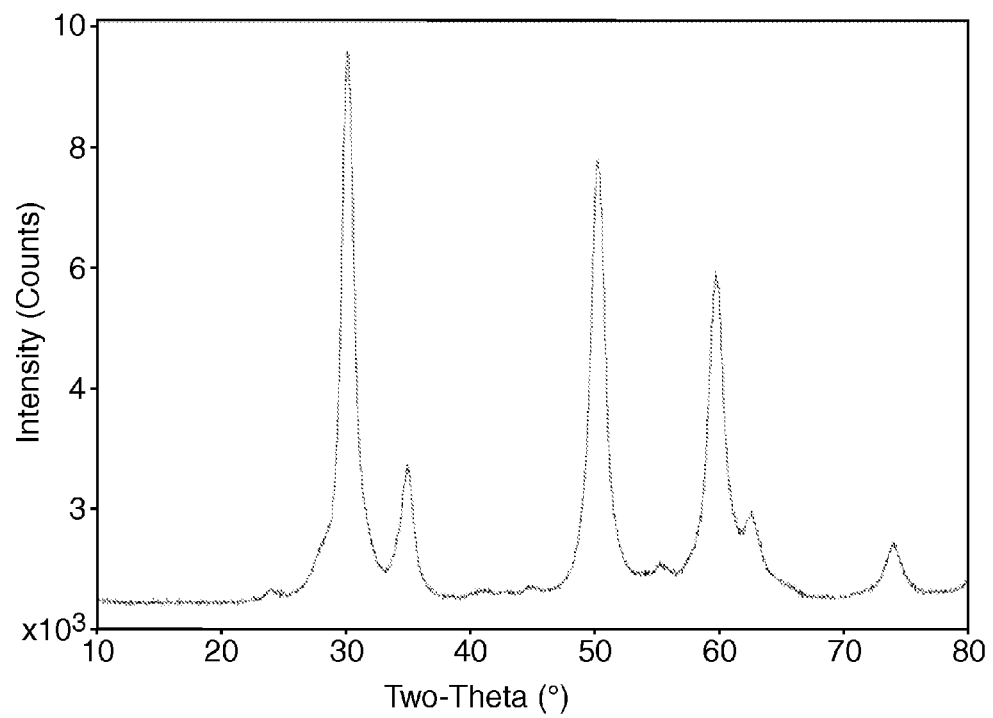
FIG. 3 shows an x-ray diffraction scan for exemplary zirconia-containing nanoparticles.

The zirconia-containing nanoparticles are crystalline. Crystalline zirconia tends to have a higher refractive index and higher x-ray scattering capability than amorphous zirconia. Due to the difficulty in separately quantifying cubic and tetragonal crystal structures for small particles using x-ray diffraction (i.e., the (1 1 1) peak for cubic zirconia often overlaps with the (1 0 1) peak for tetragonal zirconia), these two crystal structures are combined. For example, as shown in FIG. 3 for exemplary zirconia-containing nanoparticles, the combination of these two peaks appears at about 30.5 degrees (2θ) in the x-ray diffraction pattern. If yttrium is present, at least 70 percent of the total peak area of the x-ray diffraction scan is attributed to a cubic structure, tetragonal structure, or a combination thereof with the balance being monoclinic. For example, at least 75 percent, at least 80 percent, or at least 85 percent of the total peak area of some x-ray diffraction scans can be attributed to a cubic crystal structure, tetragonal crystal structure, or a combination thereof. Cubic and tetragonal crystal structures tend to promote the formation of low aspect ratio primary particles having a cube-like shape when viewed under an electron microscope.

Stated differently, at least 70 weight percent of the zirconia nanoparticles are present in the cubic or tetragonal crystal structure. In some embodiments, at least 75 weight percent, at least 80 weight percent, at least 85 weight percent, at least 90 weight percent, or at least 95 weight percent of the zirconia nanoparticles are present in the cubic or tetragonal crystal structure.

The zirconia particles usually have an average primary particle size no greater than 50 nanometers, no greater than 40 nanometers, no greater than 30 nanometer, no greater than 25 nanometers, no greater than 20 nanometers, no greater than 15 nanometers, or no greater than 10 nanometers. The primary particle size, which refers to the non-associated particle size of the zirconia particles, can be determined by x-ray diffraction as described in the Examples section.

The effluent of the hydrothermal treatment usually contains non-associated zirconia-containing nanoparticles. The zirconia-containing sol effluent is typically clear. In contrast, zirconia-containing sols that contain agglomerated or aggregated particles usually tend to have a milky or cloudy appearance. The zirconia-containing sols often have a high optical transmission due to the small size and non-associated form of the primary zirconia particles in the sol. High optical transmission of the sol can be desirable in the preparation of transparent or translucent composite materials. As used herein, "optical transmission" refers to the amount of light that passes through a sample (e.g., a zirconia-containing sol) divided by the total amount of light incident upon the sample. The percent optical transmission may be calculated using the equation $$100(I/I_O)$$

where I is the light intensity passing though the sample and $I_O$ is the light intensity incident on the sample. The optical transmission may be determined using an ultraviolet/visible spectrophotometer set at a wavelength of 600 nanometers with a 1 centimeter path length. The optical transmission is a function of the amount of zirconia in a sol. For zirconia-containing sols having about 1 weight percent zirconia, the optical transmission is typically at least 70 percent, at least 80 percent, or at least 90 percent. For zirconia-containing sols having about 10 weight percent zirconia, the optical transmission is typically at least 20 percent, at least 50 percent, or at least 70 percent.

The extent of association between the primary particles can be determined from the hydrodynamic particle size. The hydrodynamic particle size is measured using Photon Correlation Spectroscopy and is described in more detail in the Examples section below. The term "hydrodynamic particle size" and "volume-average particle size" are used interchangeably herein. If the particles of zirconia are associated, the hydrodynamic particle size provides a measure of the size of the aggregates and/or agglomerates of primary particles in the zirconia sol. If the particles of zirconia are non-associated, the hydrodynamic particle size provides a measure of the size of the primary particles.

A quantitative measure of the degree of association between the primary particles in the zirconia sol is the dispersion index. As used herein the "dispersion index" is defined as the hydrodynamic particle size divided by the primary particle size. The primary particle size (e.g., the weighted average crystallite size) is determined using x-ray diffraction techniques and the hydrodynamic particle size (e.g., the volume-average particle size) is determined using Photon Correlation Spectroscopy. As the association between primary particles in the sol decreases, the dispersion index approaches a value of 1 but can be somewhat higher or lower. The zirconia-containing nanoparticles typically have a dispersion index of about 1 to 5, about 1 to 4, about 1 to 3, about 1 to 2.5, or about 1 to 2.

Photon Correlation Spectroscopy can be used to further characterize the zirconia particles in the sol. For example, the intensity of the light scattered by particles is proportional to the sixth power of the particle diameter. Consequently, a light-intensity distribution tends to be more sensitive to larger particles than smaller ones. One type of intensity-based size available from Photo Correlation Spectroscopy is the Z-average size. It is calculated from the fluctuations in the intensity of scattered light using a cumulants analysis. This analysis also provides a value called the polydispersity index, which is a measure of the breadth of the particle size distribution. The calculations for the Z-average size and polydispersity index are defined in the ISO standard document 13321:1996 E.

The zirconia particles tend to have a Z-average size that is no greater than 70 nanometers, no greater than 60 nanometers, no greater than 50 nanometers, no greater than 40 nanometers, no greater than 35 nanometers, or no greater than 30 nanometers.

The polydispersity index is often less than 0.5, less than 0.4, less than 0.3, less than 0.2, or less than 0.1. A polydispersity index near 0.5 often indicates a broad particle size distribution while a polydispersity index near 0.1 often indicates a narrow particle size distribution.

In addition to the Z-average size and polydispersity index, a complete light-intensity distribution can be obtained during analysis using Photon Correlation Spectroscopy. This can further be combined with the refractive indices of the particles and the refractive index of the suspending medium to calculate a volume distribution for spherical particles. The volume distribution gives the percentage of the total volume of particles corresponding to particles of a given size range. The volume-average size is the size of a particle that corresponds to the mean of the volume distribution. Since the volume of a particle is proportional to the third power of the diameter, this distribution is less sensitive to larger particles than an intensity-based size distribution. That is, the volume-average size will typically be a smaller value than the Z-average size. The zirconia sols typically have a volume-average size that is no greater than 50 nanometers, no greater than 40 nanometers, no greater than 30 nanometers, no greater than 25 nanometers, no greater than 20 nanometers, or no greater than 15 nanometers. The volume-average size is used in the calculation of the dispersion index.

In another aspect, a method of preparing a composite material is provided. The method includes preparing non-associated, zirconia-containing nanoparticles as described above and then suspending or dispersing the zirconia-containing nanoparticles in an organic matrix. Any suitable means known in the art can be used to suspend or disperse the zirconia-containing nanoparticles in an organic matrix. Preferably, any method used for suspending or dispersing the zirconia-containing nanoparticles in the organic matrix material does not result in agglomeration or aggregation.

In some applications, the zirconia-containing nanoparticles can be suspended or dispersed in the organic matrix without any further surface modification. The organic matrix can be added directly to the effluent from the continuous hydrothermal reactor. Alternatively, the organic matrix can be added to the effluent after treatment to remove at least some of the water, after treatment to remove at least some of the carboxylic acids and/or anions thereof, or after both treatments. The organic matrix that is added is often a polymerizable composition that is subsequently polymerized and/or crosslinked to form a polymeric material.

In one example, the effluent of the continuous hydrothermal reactor can be subjected to a solvent exchange process. An organic solvent having a higher boiling point than water is added to the effluent. The water then can be removed by a method such as, for example, distillation, rotary evaporation, oven drying, or the like. Depending on the conditions used for removing the water, at least a portion of the dissolved carboxylic acid and/or anion thereof can also be removed. The organic matrix can be added to the treated effluent (i.e., the organic matrix is added to the zirconia-containing nanoparticle suspended in the organic solvent used in the solvent exchange process).

Alternatively, an organic matrix having a higher boiling point than water can be added to the effluent along with an optional solvent. The water and optional solvent can be removed by a method such as, for example, distillation, rotary evaporation, oven drying, or the like. Depending on the conditions used for removing the water and optional solvent, at least a portion of the dissolved carboxylic acid and/or anion thereof can also be removed.

In another example, the dissolved carboxylic acid and/or anion thereof in the effluent from the continuous hydrothermal reactor can be removed by a process such as dialysis, diafiltration, or ion exchange. An organic matrix and optional organic solvent can be added either before or after removal of most of the water from the treated effluent (e.g., the effluent treated by dialysis, diafiltration, or ion exchange). If the organic matrix and optional organic solvent is added before removal of most of the water, the boiling point of the organic matrix is selected to be greater than the boiling point of water. The water can be removed using a method such as distillation, rotary evaporation, or oven drying. The optional organic solvent is typically removed with the water. Alternatively, the pH of the treated effluent can be adjusted to precipitate the zirconia-containing nanoparticles from the treated effluent. The precipitated zirconia-containing nanoparticles can be collected by filtration or centrifugation. Any remaining water can be removed either before or after mixing the filtered or centrifuged zirconia-containing nanoparticle with an organic matrix.

In yet another example, the zirconia-sol can be dried to form a powder. The dried powder can be suspended or dispersed in water or a solvent. Alternatively, the dried powder can be suspended or dispersed in an organic matrix with or without the addition of an optional solvent.

In other applications, however, the zirconia-containing nanoparticles are further treated with a surface modification agent to further improve compatibility with the organic matrix material. Surface modification agents may be represented by the formula A-B where the A group is capable of attaching to the surface of a zirconia-containing nanoparticle and B is a compatibility group. Group A can be attached to the surface by adsorption, formation of an ionic bond, formation of a covalent bond, or a combination thereof. Group B can be reactive or non-reactive and often tends to impart characteristics to the zirconia-containing nanoparticles that are compatible (i.e., miscible) with an organic solvent, with an organic matrix material, or both. For example, if the solvent is non-polar, group B is typically selected to be non-polar as well. Suitable B groups include linear or branched hydrocarbons that are aromatic, aliphatic, or both aromatic and aliphatic. The surface modifying agents include, but are not limited to, carboxylic acids and/or anions thereof, sulfonic acids and/or anions thereof, phosphoric acids and/or anions thereof, phosphonic acids and/or anions thereof, silanes, amines, and alcohols.

In some embodiments, the surface modification agent is a carboxylic acid and/or anion thereof and the compatibility B group can impart a polar character to the zirconia-containing nanoparticles. For example, the surface modification agent can be a carboxylic acid and/or anion thereof having a polyalkylene oxide group. In some embodiments, the carboxylic acid surface modification agent is of the following formula.

In this formula, Q is a divalent organic linking group, x is an integer in the range of 1 to 10, and y is an integer in the range of 1 to 4. The group Q is often an alkylene group, alkenylene group, arylene, oxy, thio, carbonyloxy, carbonylimino, or a combination thereof. Representative examples of this formula include, but are not limited to, 2-[2-(2-methoxyethoxy)ethoxy]acetic acid (MEEAA) and 2-(2-methoxyethoxy)acetic acid (MEAA). Other representative examples are the reaction product of an aliphatic or aromatic anhydride and a polyalkylene oxide mono-ether such as succinic acid mono-[2-(2-methoxy-ethoxy)-ethyl]ester, maleic acid mono-[2-(2-methoxy-ethoxy)-ethyl]ester, and glutaric acid mono-[2-(2-methoxy-ethoxy)-ethyl]ester.

Still other carboxylic acid surface modifying agents are the reaction product of phthalic anhydride with an organic compound having a hydroxyl group. Suitable examples include, for example, phthalic acid mono-(2-phenylsulfanyl-ethyl)ester, phthalic acid mono-(2-phenoxy-ethyl)ester, or phthalic acid mono-[2-(2-methoxy-ethoxy)-ethyl]ester. In some examples, the organic compound having a hydroxyl group is a hydroxyl alkyl(meth)acrylate such as hydroxyethyl(meth)acrylate, hydroxypropyl(meth)acrylate, or hydroxylbutyl (meth)acrylate. Examples include, but are not limited to, succinic acid mono-(2-acryloyloxy-ethyl)ester, maleic acid mono-(2-acryloyloxy-ethyl)ester, glutaric acid mono-(2-acryloyloxy-ethyl)ester, phthalic acid mono-(2-acryloyloxy-ethyl)ester, and phthalic acid mono-(2-acryloyl-butyl)ester. Still others include mono-(meth)acryloxy polyethylene glycol succinate and the analogous materials made from maleic anhydride glutaric anhydride, and phthalic anhydride.

In other examples, the surface modification agent is the reaction product of polycaprolactone and succinic anhydride.

In other embodiments, the surface modification agent is a carboxylic acid and/or anion thereof and the compatibility B group can impart a non-polar character to the zirconia-containing nanoparticles. For example, the surface modification agent can be a carboxylic acid and/or anion thereof having a linear or branched aromatic group or aliphatic hydrocarbon group. Representative examples of include octanoic acid, dodecanoic acid, stearic acid, oleic acid, and combinations thereof.

In still other embodiments, the surface modification agent is a carboxylic acid and/or anion thereof and the compatibility B group can be reactive with a polymerizable organic matrix (e.g., the B group contains a polymerizable group). Reactive carboxylic acid surface modifying agents (e.g., carboxylic acids with polymerizable groups) include, for example, acrylic acid, methacrylic acid, beta-carboxyethyl acrylate, mono-2-(methacryloxyethyl)succinate, and combinations thereof. A useful surface modification agent that can impart both polar character and reactivity to the zirconia-containing nanoparticles is mono(methacryloxypolyethyleneglycol) succinate. This material may be particularly suitable for addition to radiation curable acrylate and/or methacrylate organic matrix materials.

Exemplary silanes include, but are not limited to, alkyltrialkoxysilanes such as n-octyltrimethoxysilane, n-octyltriethoxysilane, isooctyltrimethoxysilane, dodecyltrimethoxysilane, octadecyltrimethoxysilane, propyltrimethoxysilane, and hexyltrimethoxysilane; methacryloxyalkyltrialkoxysilanes or acryloxyalkyltrialkoxysilanes such as 3-methacryloxypropyltrimethoxysilane, 3-acryloxypropyltrimethoxysilane, and 3-(methacryloxy)propyltriethoxysilane; methacryloxyalkylalkyldialkoxysilanes or acryloxyalkylalkyldialkoxysilanes such as 3-(methacryloxy)propylmethyldimethoxysilane, and 3-(acryloxypropyl)methyldimethoxysilane; methacryloxyalkyldialkylalkoxysilanes or acyrloxyalkyldialkylalkoxysilanes such as 3-(methacryloxy) propyldimethylethoxysilane; mercaptoalkyltrialkoxylsilanes such as 3-mercaptopropyltrimethoxysilane; aryltrialkoxysilanes such as styrylethyltrimethoxysilane, phenyltrimethoxysilane, phenyltriethoxysilane, and p-tolyltriethoxysilane; vinyl silanes such as vinylmethyldiacetoxysilane, vinyldimethylethoxysilane, vinylmethyldiethoxysilane, vinyltrimethoxysilane, vinyltriethoxysilane, vinyltriacetoxysilane, vinyltriisopropoxysilane, vinyltrimethoxysilane, vinyltriphenoxysilane, vinyltri-t-butoxysilane, vinyltris(isobutoxy)silane, vinyltriisopropenoxysilane, and vinyltris(2-methoxyethoxy)silane; 3-glycidoxypropyltrialkoxysilane such as glycidoxypropyltrimethoxysilane; polyether silanes such as N-(3-triethoxysilylpropyl)methoxyethoxyethoxyethyl carbamate (PEG3TES), N-(3-triethoxysilylpropyl)methoxyethoxyethoxyethyl carbamate (PEG2TES), and SILQUEST A-1230; and combinations thereof.

Any known method of adding the surface modification agent to the zirconia-containing nanoparticles can be used. The surface modification agent can be added before or after any removal of at least a portion of the carboxylic acids and/or anions thereof from the zirconia-containing sol. The surface modification agent can be added before or after removal of the water from the zirconia-containing sol. The organic matrix can be added after surface modification or simultaneously with surface modification.

In one exemplary method, the effluent of the continuous hydrothermal reactor can be subjected to a solvent exchange process. An organic solvent having a boiling point greater than water is added to the effluent. The water can be removed by a method such as, for example, distillation, rotary evaporation, oven drying, or the like. Depending on the conditions used for removing the water, at least a portion of the dissolved carboxylic acid and/or anion thereof can also be removed. The surface modification agent can be added either before or after the water removal step. The surface modification agent can be selected to facilitate the extraction of the zirconia-containing nanoparticles into the organic solvent used in the solvent exchange process. The organic matrix is typically added after removal of the water. The organic solvent used in the solvent exchange process can often be removed after addition of the organic matrix using a method such as distillation, rotary evaporation, oven drying, or the like. Alternatively, the organic matrix, organic solvent, and the additional surface modification agent can be added at the same time to the effluent of the continuous hydrothermal reactor.

In another example, the effluent of the continuous hydrothermal reactor can be dried to form a powder. The dried powder can be suspended or dispersed in an organic solvent or water to which a surface modification agent has been added. The surface modification agent is selected to facilitate the dispersion of the zirconia-containing nanoparticles into the liquid medium.

In an alternative example, the effluent of the continuous hydrothermal reactor can be treated with a surface modification agent before being dried to form a powder. The surface modification agent is added to the effluent of the continuous hydrothermal reactor. The surface modification agent is selected to facilitate the dispersion of the zirconia-containing nanoparticles into an organic matrix. The treated effluent is then dried to a powder. The dried powder can be suspended or dispersed in an organic matrix.

In some embodiments, the effluent from the hydrothermal reactor is concentrated (but not dried to a powder) to remove at least a portion of the aqueous based medium. This concentration process often removes at least a portion of the carboxylic acids and/or anions thereof. Optionally, additional dissolved carboxylic acid and/or anion thereof in the concentrate can be removed by a treatment such as dialysis, diafiltration, or ion exchange. The concentrated and optionally treated zirconia-containing sol can be mixed with the surface modification agent and an optional organic solvent. After surface treatment, the surface modified zirconia-containing nanoparticle can be mixed with an organic matrix. The optional organic solvent and the remaining water can be removed before or after addition of the organic matrix. Alternatively, the concentrated zirconia-containing sol can be mixed with both the organic matrix and the surface modification agent in the presence of an optional organic solvent. The optional organic solvent and the remaining water can be removed after surface modification.

In another embodiment, the effluent from the hydrothermal reactor is concentrated (but not dried to a powder) to remove at least a portion of the aqueous based medium. This concentration process often removes at least a portion of the carboxylic acids and/or anions thereof. Optionally, additional dissolved carboxylic acid and/or anion thereof in the concentrate can be removed by a treatment such as dialysis, diafiltration, or ion exchange. The concentrated and optionally treated zirconia-containing sol can be mixed with the surface modification agent. After surface treatment, the mixture can be dried to form a powder. This surface modified zirconia-containing nanoparticle powder can be dispersed into an organic matrix.

In yet another example, the dissolved carboxylic acid and/or anion thereof in the effluent from the continuous hydrothermal reactor can be removed by a process such as dialysis, diafiltration, or ion exchange. The surface modification agent can be added directly to the treated effluent (e.g., the effluent treated using ion exchange, diafiltration, or dialysis). Optionally, a polar co-solvent may be added to increase the solubility of the surface modification agent in the aqueous phase. Suitable polar co-solvents include water-miscible organic compounds such as, for example, 1-methoxy-2-propanol, ethanol, isopropanol, ethylene glycol, N,N-dimethylacetamide, N-methylpyrrolidone, or the like. The organic matrix can be added either before or after removal of most of the water and optional polar co-solvents. The water and optional polar co-solvent can be removed, for example, by distillation, rotary evaporation, or oven drying if the organic matrix has a higher boiling point. The water and optional polar co-solvent can also be removed by precipitation of the surface modified zirconia-containing nanoparticle by adjusting the pH. Alternatively, the surface modification agent can change the polarity of the zirconia-containing nanoparticles resulting in precipitation of the surface modified zirconia-containing nanoparticles. The precipitated zirconia-containing nanoparticle can be separated from the liquid phase by filtration or centrifugation. Any remaining water and optional co-solvent can be removed either before or after mixing the filtered or centrifuged zirconia-containing nanoparticles with an organic matrix.

The surface modification reactions can occur at room temperature (e.g., 20° C. to 25° C.) or at an elevated temperature (e.g., up to about 95° C.). When the surface modification agents are acids such as carboxylic acids, the zirconia-containing nanoparticles typically can be surface-modified at room temperature. When the surface modification agents are silanes, the zirconia-containing nanoparticles are typically surface modified at elevated temperatures.

The organic matrix typically includes a polymeric material or a precursor to a polymeric material such as a monomer or an oligomer having a polymerizable group. Any suitable technique can be used to combine the zirconia-containing nanoparticles with the organic matrix. For example, if the organic matrix is a precursor to a polymeric material, the zirconia-containing nanoparticles can be added prior to the polymerization reaction. If the polymeric material is a thermoplastic, the polymeric material and the zirconia-containing nanoparticles can be combined using a process such as extrusion, milling, or Brabender mixing. The composite material containing a precursor of a polymeric material is often shaped or coated before polymerization.

Representative examples of monomers include, but are not limited to, (meth)acrylates, styrenes, epoxies, and the like. Representative examples of reactive oligomers include, but are not limited to, (meth)acrylated polyesters, (meth)acrylated polyurethanes, or acrylics. Representative examples of polymeric material include, but are not limited to, polyolefins, polyesters, polyurethanes, poly(meth)acrylates, polystyrenes, polycarbonates, and polyimides.

One exemplary process for suspending or dispersing the zirconia-containing nanoparticles in an organic matrix includes concentrating the effluent from the hydrothermal reactor to about 40 percent solids using a method such as distillation or rotary evaporation. A co-solvent and surface modification agent is then added to the concentrate. After addition of the organic matrix, the co-solvent, water, and at least a portion of the dissolved carboxylic acid and/or anion thereof are removed. In a more specific example, the surface modification agent is a carboxylic acid such as a carboxylic acid having a polyalkelyene oxide group and the organic matrix is the reaction product of at least one (meth)acrylate.

In some more specific methods of suspending or dispersing the zirconia-containing nanoparticles in an organic matrix, the zirconia-containing nanoparticles are treated with a silane surface modifying agent. Prior to addition of the silane surface modifying agent or agents, the carboxylic acid and/or anion thereof in the sol has typically been reduced or removed by a method such as ion exchange, dialysis, diafiltration, or concentration (drying) followed by dilution with water. The silane surface modifying agent is combined with the zirconia-containing nanoparticles in the form of a sol. In some methods, two or more silane surface modifying agents are added. The zirconia-containing sol often has a pH in the range of 2 to 5 and an optional miscible, organic solvent can be present. The resulting mixture is often heated for 3 to 16 hours at 80° C. to 90° C. but other times and temperatures can be used.

After cooling, the mixture is added to a dilute aqueous ammonia solution. Other base materials may be used as an alternative to the ammonia solution. The addition of the mixture to the base will typically lead to precipitation of the zirconia-containing nanoparticles. The base is believed to facilitate removal of the attached (e.g., sorbed) carboxylic acids and/or anions thereof from the surface of the silane-treated zirconia-containing nanoparticles. Subsequent filtration and washing of the solids allows for further removal of the acids and/or anions thereof. Following filtration, the silane-treated zirconia-containing nanoparticles can be dispersed in a solvent and subsequently incorporated into a resin via solvent exchange. Alternatively, the solids from filtration can be dried to a powder and then dispersed or suspended in the resin.

EXAMPLES

These examples are for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

| Table of Abbreviations | |
|---|---|
| Abbreviation or Trade Designation | Description |
| MEEAA | 2-(2-(2-methoxyethoxy) ethoxy) acetic acid |
| Zirconium acetate (Solution A) | An aqueous solution of zirconium acetate containing nominally 16.3 weight percent Zr that is commercially available from Magnesium Elektron, Inc. (Flemington, NJ). |
| Zirconium acetate (Solution B) | An aqueous solution of zirconium acetate containing nominally 16.3 weight percent Zr that is commercially available from Magnesium Elektron, Inc. (Flemington, NJ). |
| Zirconium acetate (Solution C) | An aqueous solution of zirconium acetate containing nominally 16.3 weight percent Zr that is commercially available from Magnesium Elektron, Inc. (Flemington, NJ). |
| DI water | De-ionized water |
| Yttrium acetate hydrate | $Y(CH_3COO)_3 \cdot 4H_2O$, which is commercially available from AMR Technologies Inc (Toronto Canada) |
| TBPEA | Tribromophenoxyethyl acrylate, which is commercially available from Dai-Chi Kogyo Seiyaku Co., Ltd. (Kyoto, Japan) |
| PEA | Phenoxyethyl acrylate, which is commercially available from Sartomer (Exton, PA) |
| PROSTABB 5198 | A radical inhibitor that is commercially available from Ciba Specialties (Hawthorne, NY) |
| 1-Methoxy-2-propanol | An alcohol that is commercially available from Aldrich Chemical (Milwaukee, WI) |
| Maleic acid | An organic acid that is commercially available from Aldrich Chemical |
| TMPTA | Trimethylolpropane triacrylate that is commercially available from Sartomer Company Inc. (Exton PA) |
| HEAP | Phthalic acid mono-ester of 2-hydroxylethyl acrylate as described in Preparatory Example 1 |
| NaCl | Sodium chloride, which is commercially available from EM Science (Gibbstown, NJ) |
| $CaCl_2$ | Calcium chloride, which is commercially available from EM Science (Gibbstown, NJ) |
| AMBERLITE IR-120 | Ion exchange resin that is available from Aldrich Chemical Company (Milwaukee, WI) or Rohm and Haas (Philadelphia, PA) |
| Phthalic anhydride | An anhydride that is commercially available from Aldrich Chemical Company (Milwaukee, WI) |
| 2-Hydroxyethyl acrylate | An acrylate monomer that is commercially available from Aldrich Chemical Company (Milwaukee, WI) |
| 2-Hydroxyethyl methacrylate | A methacrylate monomer that is commercially available from Aldrich Chemical Company (Milwaukee, WI) |
| SR603 | Polyethylene Glycol (400) dimethacrylate that is commercially available from Sartomer Company Inc. (Exton, PA) |
| Methacryloxy propyltrimethoxy silane | A silane coupling agent that is commercially available from Aldrich Chemical Company (Milwaukee, WI) |
| SILQUEST A1230 | A silane coupling agent that is commercially available from GE Silicones-OSi Specialties (Wilton, CT) |
| Triethylamine | A base that is commercially available from Aldrich Chemical Company (Milwaukee, WI) |

-continued

Table of Abbreviations

| Abbreviation or Trade Designation | Description |
| --- | --- |
| Zirconium oxynitrate | A zirconium salt that is commercially available from Teledyne Wah Chang Albany (Albany, OR) |
| Zirconium dichloride oxide octahydrate | A zirconium salt that is commercially available from Avocado Research Chemicals Ltd. (Lancashire, UK) |
| Resin 1 | A mixture containing 50/30/20 weight percent TBPEA/PEA/TMPTA |
| Ex | Example |
| CEx | Comparative Example |

Test Methods
Photon Correlation Spectroscopy (PCS)

Particle size measurements were made using a Zeta Sizer—Nano Series, Model ZEN3600 instrument equipped with a red laser having a 633 nanometer wavelength. This instrument is commercially available from Malvern Instruments Inc. (Westborough, Mass.). The samples, which were run as prepared, were poured into a disposable, 1 centimeter square polystyrene cuvette to a liquid depth of 10 to 15 mm. The cuvette was placed into the instrument and equilibrated at 25° C. The instrument parameters were set as follows: dispersant refractive index 1.330, dispersant viscosity 0.8872 mPa-second, material refractive index 2.10, and material absorption value 0.10 units. The automatic size-measurement procedure was then run. The instrument automatically adjusted the laser-beam position and attenuator setting to obtain the best measurement of particle size.

The ZEN3600 instrument illuminated the sample with a laser and analyzed the intensity fluctuations of the light scattered from the particles at an angle of 173 degrees. The method of Photon Correlation Spectroscopy (PCS) was used by the instrument to calculate the particle size. PCS uses the fluctuating light intensity to measure the Brownian motion of particles in the liquid. The particle size is then calculated to be the diameter of a sphere that moves at the measured speed.

The intensity of the light scattered by a particle is proportional to the sixth power of the particle diameter. The Z-average size or cumulant mean is a mean calculated from the intensity fluctuations and the calculation is based on the assumptions that the particles are mono-modal, mono-disperse, and spherical. Related functions calculated from the fluctuating light intensity are the Intensity Distribution and its mean. The mean of the Intensity Distribution is calculated based on the assumption that the particles are spherical. Both the Z-average size and the Intensity Distribution mean are more sensitive to larger particles than smaller ones.

The Volume Distribution gives the percentage of the total volume of particles corresponding to particles of a given size range. The volume-average size is the size of a particle that corresponds to the mean of the Volume Distribution. Since the volume of a particle is proportional to the third power of the diameter, this distribution is less sensitive to larger particles than the Z-average size. Thus, the volume-average size will typically be a smaller value than the Z-average size.

Crystalline Structure and Size (XRD Analysis)

Dried zirconia samples were ground by hand using an agate mortar and pestle. A liberal amount of the sample was applied by spatula to a glass microscope slide on which a section of double sided adhesive tape had been adhered. The sample was pressed into the adhesive on the tape by forcing the sample against the adhesive with the spatula blade. Excess sample was removed by scraping the sample area with the edge of the spatula blade, leaving a thin layer of particles adhered to the adhesive. Loosely adhered materials remaining after the scraping were removed by forcefully tapping the microscope slide against a hard surface. In a similar manner, corundum (Linde 1.0 μm alumina polishing powder, Lot Number C062, Union Carbide, Indianapolis, Ind.) was prepared and used to calibrate the X-ray diffractometer for instrumental broadening.

X-ray diffraction scans were obtained using a Philips vertical diffractometer having a reflection geometry, copper $K_\alpha$ radiation, and a proportional detector registry of the scattered radiation. The diffractometer was fitted with variable incident beam slits, fixed diffracted beam slits, and a graphite diffracted beam monochromator. The survey scan was recorded from 25 to 55 degrees two theta (2θ) using a step size of 0.04 degrees and a dwell time of 8 seconds. X-ray generator settings of 45 kV and 35 mA were used. Data for the corundum standard was collected on three separate areas of several individual corundum mounts. Likewise, data was collected on three separate areas of the thin layer sample mount.

The observed diffraction peaks were identified by comparison to reference diffraction patterns contained within the International Center for Diffraction Data (ICDD) powder diffraction database (sets 1-47, ICDD, Newton Square, Pa.). The diffraction peaks for the samples were attributed to either cubic/tetragonal (C/T) or monoclinic (M) forms of zirconia. The (1 1 1) peak for the cubic phase and (1 0 1) peak for the tetragonal phase could not be separated so these phases were reported together. The amounts of each zirconia form were evaluated on a relative basis and the form of zirconia having the most intense diffraction peak was assigned the relative intensity value of 100. The strongest line of the remaining crystalline zirconia form was scaled relative to the most intense line and given a value between 1 and 100.

Peak widths for the observed diffraction maxima due to corundum were measured by profile fitting. The relationship between mean corundum peak widths and corundum peak position (2θ) was determined by fitting a polynomial to these data to produce a continuous function used to evaluate the instrumental breadth at any peak position within the corundum testing range. Peak widths for the observed diffraction maxima due to zirconia were measured by profile fitting the observed diffraction peaks. The following peak widths were evaluated depending on the zirconia phase found to be present:

Cubic/Tetragonal (C/T): (1 1 1)
Monoclinic (M): (−1 1 1), and (1 1 1)

A Pearson VII peak shape model with $K_{\alpha 1}$ and $K_{\alpha 2}$ wavelength components and linear background model were used for all measurements. Widths were calculated as the peak full width at half maximum (FWHM) having units of degrees. The profile fitting was accomplished by use of the capabilities of the JADE diffraction software suite. Sample peak widths were evaluated for the three separate data collections obtained for the same thin layer sample mount.

Sample peaks were corrected for instrumental broadening by interpolation of instrumental breadth values from corundum instrument calibration and corrected peak widths converted to units of radians. The Scherrer equation was used to calculate the primary crystal size.

$$\text{Crystallite Size}(D) = K\lambda/\beta(\cos\theta)$$

In the Scherrer equation, K is the form factor (here 0.9), λ is the wavelength (1.540598 Å), β is the calculated peak width after correction for instrumental broadening (in radians), and θ equals half the peak position (scattering angle). β is equal to [calculated peak FWHM−instrumental breadth] (converted to radians) where FWHM is full width at half maximum. The cubic/tetragonal (C/T) mean crystallite size was measured as the average of three measurements using (1 1 1) peak. That is, $$C/T \text{ mean crystallite size} = [D(1\ 1\ 1)_{area\ 1} + D(1\ 1\ 1)_{area\ 2} + D(1\ 1\ 1)_{area\ 3}]/3.$$

The monoclinic (M) crystallite size was measured as the average of three measurement using the (−1 1 1) peak and three measurements using the (1 1 1) peak.

$$M \text{ mean crystallite size} = [D(-1\ 1\ 1)_{area\ 1} + D(-1\ 1\ 1)_{area\ 2} + D(-1\ 1\ 1)_{area\ 3} + D(1\ 1\ 1)_{area\ 1} + D(1\ 1\ 1)_{area\ 2} + D(1\ 1\ 1)_{area\ 3}]/6$$

The weighted average of the cubic/tetragonal (C/T) and monoclininc phases (M) were calculated.

$$\text{Weighted average} = [(\% C/T)(C/T \text{ size}) + (\% M)(M \text{ size})]/100$$

In this equation, % C/T equals the percent crystallinity contributed by the cubic and tetragonal crystallite content of the $ZrO_2$ particles; C/T size equals the size of the cubic and tetragonal crystallites; % M equals the percent crystallinity contributed by the monoclinic crystallite content of the $ZrO_2$ particles; and M size equals the size of the monoclinic crystallites.

Dispersion Index

The dispersion index is equal to the volume-average size measured using Photon Correlation Spectroscopy divided by the weighted average crystallite size measured by XRD.

Polydispersity Index

The polydispersity index is a measure of the breadth of the particle size distribution and is calculated along with the Z-average size in the cumulants analysis of the intensity distribution using Photon Correlation Spectroscopy. For values of the polydispersity index of 0.1 and below, the breadth of the distribution is considered narrow. For values above 0.5, the breadth of the distribution is considered broad and it is unwise to rely on the Z-average size to fully characterize the particle size. Instead, one should characterize the particles using a distribution analysis such as the intensity or volume distribution. The calculations for the Z-average size and polydispersity index are defined in the ISO standard document 13321: 1996 E.

Weight Percent Solids

The weight percent solids were determined by drying a sample weighing 3 to 6 grams at 120° C. for 30 minutes. The weight percent solids can be calculated from the weight of the wet sample (i.e., weight before drying, $weight_{wet}$) and the weight of the dry sample (i.e., weight after drying, $weight_{dry}$) using the following equation.

$$\text{Wt-}\% \text{ solids} = 100(weight_{dry})/weight_{wet}$$

Thermal Gravimetric Analysis (TGA)

The percent conversion of the zirconium-containing intermediate and the weight percent inorganic oxides were determined by thermal gravimetric analysis using a Model 2950 TGA from TA Instruments (New Castle, Del.).

The percent conversion of the zirconium-containing sample under analysis is given by the following equation $$\% \text{ Conversion} = 100(A-B)/(A-C)$$

where A is the percent weight loss of the feedstock, B is the percent weight loss of the zirconium-containing sample under analysis, and C is the percent weight loss of a zirconia-containing standard known or believed to be completely converted.

To determine the percent weight loss, a sample of the feedstock, a sample of the zirconia-containing sample under analysis and the zirconia-containing standard were each dried at 120° C. in an oven for 30 minutes analysis. Each sample was in the range of 3 to 6 grams. Each dried sample (e.g., 30 to 60 milligrams) was equilibrated at 85° C. in the TGA. The temperature was then increased at a rate of 20° C./minute to 200° C., held at 200° C. for 20 minutes, increased at a rate of 20° C./minute to 900° C., and held at 900° C. for 20 minutes. The organic material was volatilized between 200° C. and 900° C. leaving only the inorganic oxides such as $ZrO_2$ and $Y_2O_3$. The percent weight loss was calculated using the following equation.

$$\% \text{ weight loss} = 100(\%\text{-weight}_{200C} - \%\text{-weight}_{900C})/\%\text{-weight}_{900C}$$

The %-$weight_{200C}$ was calculated from the weight of each sample at 200° C. ($weight_{200C}$) and from the weight of each dried sample ($weight_{dry}$) used for the analysis (e.g., sample dried at 120° C. before analysis).

$$\%\text{-weight}_{200C} = 100(weight_{200C})/weight_{dry}$$

The %-$weight_{900C}$ was calculated from the weight of each sample at 900° C. ($weight_{900C}$) and from the weight of each dried sample ($weight_{dry}$) used for the analysis (e.g., sample dried at 120° C. before analysis).

$$\%\text{-weight}_{900C} = 100(weight_{900C})/weight_{dry}$$

The weight percent inorganic oxide was calculated from the weight percent solids and the weight percent oxide at 900° C. That is, the weight percent inorganic oxide can be calculated using the following equation.

$$\text{wt-}\% \text{ inorganic oxides} = (\text{wt-}\% \text{ solids})(\%\text{-weight}_{900C})/100$$

Index of Refraction

The refractive index was measured using an Abbe refractometer commercially available from Milton Roy Co. (Ivyland, Pa.).

Viscosity Measurement: Bubble Time Method

The sample was added to a Pyrex test tube (13×100 mm Dow Corning 9800 13) with a beaded rim. The tube was marked in two locations positioned 2 inches (5.05 cm) apart. The first mark was 1.25 inches (3.725 cm) from the base of the tube and the second mark was 3.25 inches (8.255 cm) from the base of the tube. The sample was poured into the tube to a height corresponding to the second mark. The tube was then sealed with a cork (#3) and then with vinyl electric tape. The tube containing the sample was place in a water bath set at 40° C. (104° F.) and equilibrated to the temperature of the water bath. After equilibration, the tube was removed from the water bath and inverted to bring a bubble to the bottom of the tube. The tube was then invented a second time. The length of time was measured using a stop watch for the bubble to pass between the first mark and the second mark. After the time was recorded, the tube with the sample was placed back in the water bath to equilibrate. The measurement was repeated three times and the average was calculated. Longer times correspond to higher viscosities.

Inductively Coupled Plasma Atomic Emission Spectroscopy

Inductively Coupled Plasma Atomic Emission Spectroscopy was used to analyze the feedstock and various other samples for the amount of sodium and calcium. Liquid samples were aspirated into a high temperature argon plasma where desolvation, dissociation, atomization, and excitation occur. Each element has a well established and characteristic wavelengths associated with emission from an excited state. The intensity of the emission is typically proportional to the concentration of the element. The concentration of the element can be calculated by comparing the intensity of the emission with that of standards of known concentration.

The zirconium acetate solutions (0.20 to 0.3 grams) were accurately weighed into a centrifuge tube. Deionized water (40 mL) and hydrochloric acid (2 mL of EMD OMNITRACE concentrated hydrochloric acid (37-38 percent)) was added. The solutions were then diluted to a total of 50 mL with deionized water. Duplicates of each sample were prepared. Two blanks containing just the hydrochloric acid and water were also prepared. The samples and blanks were analyzed on an ICP optical emission spectrometer (Perkin Elmer Optima 4300 available from Perkin Elmer, Shelton, Conn.). The instrument was calibrated using a multi-element standard containing at least sodium and calcium. The standards, which were obtained from solutions available from High Purity Standards, Charleston, S.C., had concentrations of 0.2 ppm, 0.5 ppm, and 1.5 ppm (microgram per milliliter). The results were normalized to the amount of zirconium in the starting zirconium acetate solution.

Hydrothermal Reactor System

Hydrothermal Reactor A

This reactor was prepared from 100 ft (30 meters) of stainless-steel tubing (with an outside diameter of 0.25 inch (0.64 centimeters) and a wall thickness of 0.035 inch (0.089 cm)) that was immersed in a bath of peanut oil heated to 206° C. Following the reactor tube, a coil of an additional approximately 10 feet (3 meters) of stainless-steel tubing that was immersed in an ice-water bath to cool the material. The stainless-steel tubing has an outside diameter of 0.25 inch (0.64 cm) and a wall thickness of 0.035 inch (0.089 cm). A backpressure regulator valve was used to maintain an exit pressure of 400 psi.

Hydrothermal Reactor B

This reactor was prepared from 50 feet (15 meters) of Stainless Steel Braided Smooth Tube Hose (DuPont T62 Chemfluor PTFE, ¼ inch I.D., 0.040 inch thick wall available from Saint-Gobain Performance Plastics, Beaverton, Mich.). That is, the inside of the reactor was PTFE. This tube was immersed in a bath of peanut oil heated to 206° C. Following the reactor tube, a coil of an additional approximately 10 feet (3 meters) of stainless-steel tubing that was immersed in an ice-water bath to cool the material. The stainless-steel tubing has an outside diameter of 0.25 inch (0.64 cm) and a wall thickness of 0.035 inch (0.089 cm). A backpressure regulator valve was used to maintain an exit pressure of 400 psi.

Preparative Example 1

Phthalic acid mono-(2-acryloyloxy-ethyl)ester (HEAP)

Phthalic anhydride (112.1 grams), 2-hydroxyethyl acrylate (87.9 grams), and triethylamine (0.44 grams) were mixed in a round bottom flask. A small amount of dry air was bubbled into the liquid reaction mixture. The reaction mixture was mixed and heated to 75° C. and held at that temperature for six hours. The product was cooled to room temperature. NMR was used to confirm that the product was phthalic acid mono-(2-acryloyloxy-ethyl)ester. The product partially crystallized over time. The product was mixed with 1-methoxy-2-propanol to obtain a 50 weight percent solution.

Preparative Example 2

Master Batch 1

A master batch of Zirconium acetate and yttrium acetate was made by dissolving yttrium acetate (96.6 grams) in a zirconium acetate solution (solution A) (3500 grams). The master batch contained 37.4 weight percent solids (16.61 weight percent Zr and 0.736 weight percent Y).

Example 1

Figure 2:
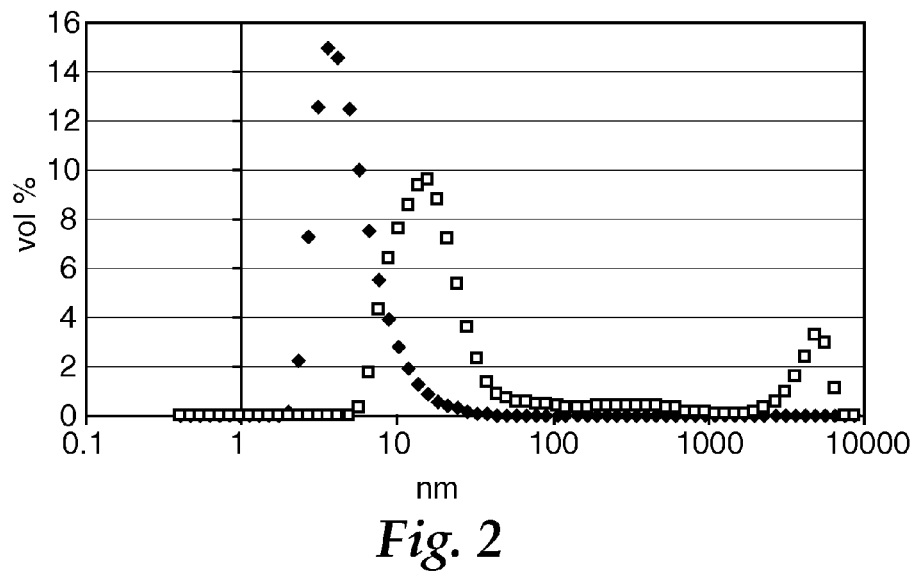
FIG. 2 shows the volume distribution of one example and one comparative example of zirconia-containing nanoparticles.

Master batch 1 (1000 grams) and DI water (2000 grams) were mixed to give a 12 weight percent solids feedstock (5.33 weight percent Zr, 0.236 weight percent Y). The feedstock was pumped at a rate of 18.6 mL/min through Hydrothermal Reactor A. A clear, crystalline-$ZrO_2$ containing sol resulted (see Tables 1, 2, and 3). The XRD scan for Example 1 is shown in FIG. 3. The volume distribution was determined using Photon Correlation Spectroscopy and is shown in FIG. 2 (diamonds).

Example 2

Master batch 1 (777.8 grams) and DI water (2722 grams) were mixed to give a 8 weight percent solids feedstock (3.55 weight percent Zr, 0.157 weight percent Y). The feedstock was pumped at a rate of 18.6 mL/min through Hydrothermal Reactor A. A slightly cloudy, crystalline-$ZrO_2$ containing sol resulted (see Tables 1, 2, and 3).

Example 3

Zirconium acetate (solution A) (645.5 grams) and DI water (2354.5 grams) were mixed to form an 8 weight percent solids feedstock (3.55 weight percent Zr, 0.0 weight percent Y). The feedstock was pumped at a rate of 18.6 mL/min through Hydrothermal Reactor A. The slightly cloudy, crystalline-$ZrO_2$ containing sol resulted (see Tables 1, 2, and 3).

Example 4

Master batch 1 (1000 grams) and DI water (2000 grams) were mixed to give a 12 weight percent solids feedstock (5.33 weight percent Zr, 0.236 weight percent Y). The feedstock was pumped at a rate of 18.6 mL/min through Hydrothermal Reactor A. A clear, crystalline-$ZrO_2$ containing sol resulted (see Tables 1, 2, and 3).

Example 5

DI water (1294 grams) was mixed with zirconium acetate (solution A) (900 grams). Yttrium acetate (24.2 grams) was added and the mixture stirred for approximately 12 hours to prepare the 15 weight percent solids feedstock (6.66 weight percent Zr, 0.295 weight percent Y). The feedstock was pumped at a rate of 13.77 mL/min through Hydrothermal Reactor B. A clear, crystalline-$ZrO_2$ containing sol resulted (see Tables 1, 2, and 3).

Example 6

DI water (1378.2 grams) was mixed with zirconium acetate (solution A) (1500 grams). Yttrium acetate (40.35 grams) was added and the mixture stirred for approximately 12 hours to prepare the 19 weight percent solids feedstock (8.44 weight percent Zr, 0.374 weight percent Y). The feedstock was pumped at a rate of 13.77 mL/min through Hydrothermal Reactor B. A clear, crystalline-$ZrO_2$ containing sol resulted (see Tables 1, 2, and 3).

Comparative Example 1

Master batch 1 (486 grams) and DI water (3014 grams) were mixed to give a 5 weight percent solids feedstock (2.22 weight percent Zr, 0.098 weight percent Y). The solution was pumped at a rate of 18.6 mL/min through Hydrothermal Reactor A. A white crystalline-$ZrO_2$ containing sol resulted (see Tables 1, 2, and 3). The large aggregate size also resulted in a settled precipitate. The volume distribution was determined using Photon Correlation Spectroscopy and is shown in FIG. 2 (squares).

Comparative Example 2

Master batch 1 (486 grams) and DI water (3014 grams) were mixed to give a 5 weight percent solids feedstock (2.22 weight percent Zr, 0.098 weight percent Y). The solution was pumped at a rate of 14.9 mL/min through Hydrothermal Reactor A. A white crystalline-$ZrO_2$ containing sol resulted (see Tables 1, 2, and 3). The large aggregate size also resulted in a settled precipitate.

Comparative Example 3

Master batch 1 (208.3 grams) and DI water (2791 grams) were mixed to give a 2.5 weight percent solids feedstock (1.11 weight percent Zr, 0.049 weight percent Y). The solution was pumped at a rate of 18.6 mL/min through Hydrothermal Reactor A. A cloudy, crystalline-$ZrO_2$ containing sol resulted (see Tables 1, 2, and 3). The large aggregate size also resulted in a settled precipitate.

TABLE 1

Effect of Feed Concentration on Product Appearance

| Example | Wt % Solids | Residence Time (min) | Temp (° C.) | Grams Yttrium per gram Zirconium | Appearance |
|---|---|---|---|---|---|
| Ex 1 | 12 | 28 | 206 | 0.044 | Clear |
| Ex 2 | 8 | 28 | 206 | 0.044 | Slightly cloudy |
| Ex 3 | 8 | 28 | 206 | 0 | Slightly cloudy |
| Ex 4 | 12 | 28 | 206 | 0.044 | Clear |
| Ex 5 | 15 | 35 | 206 | 0.044 | Clear |
| Ex 6 | 19 | 35 | 206 | 0.044 | Clear |
| CEx 1 | 5 | 28 | 206 | 0.044 | White, some settling |
| CEx 2 | 5 | 35 | 206 | 0.044 | White, some settling |
| CEx 3 | 2.5 | 28 | 206 | 0.044 | Cloudy, some settling |

TABLE 2

Effect of Feed Concentration on Product Particle Size

| Example | Wt % Solids | Z-Average size (nm) | Polydispersity Index | Volume-Average Size (nm) |
|---|---|---|---|---|
| Ex 1 | 12 | 15.0 | 0.377 | 5.45 |
| Ex 2 | 8 | 27.9 | | 7.09 |
| Ex 3 | 8 | 27.4 | 0.292 | 8.3 |
| Ex 4 | 12 | 16.4 | 0.418 | 5.29 |
| Ex 5 | 15 | 13.7 | 0.347 | 5.73 |
| Ex 6 | 19 | 16.9 | 0.286 | 6.72 |
| CEx 1 | 5 | 135 | | Multimodal |
| CEx 2 | 5 | 127 | | Multimodal |
| CEx 3 | 2.5 | 221 | | Multimodal |

TABLE 3

Effect of Feed Concentration on Crystallite Size and Dispersion Index

| Example | M Intensity | M size (nm) | C/T intensity | C/T size (nm) | % C/T | XRD Average Size (nm) | Dispersion index |
|---|---|---|---|---|---|---|---|
| Ex 1 | 7 | 6 | 100 | 8.0 | 93 | 7.9 | 0.7 |
| Ex 2 | 5 | 7.8 | 100 | 7.0 | 95 | 7.0 | 1.0 |
| Ex 3 | 66 | 9.8 | 100 | 8.5 | 60 | 9.0 | 0.9 |
| Ex 4 | 7 | 6.23 | 100 | 6.5 | 93 | 6.5 | 0.8 |
| Ex 5 | 9 | 7.3 | 100 | 8.7 | 92 | 8.6 | 0.6 |
| Ex 6 | 20 | 5.7 | 100 | 8.9 | 83 | 8.4 | 0.8 |
| CEx 1 | 5 | 9.8 | 100 | 9.5 | 95 | 9.5 | >10 |
| CEx 2 | 5 | 10.3 | 100 | 6.5 | 95 | 6.7 | >10 |
| CEx 3 | 3 | 7.5 | 100 | 5.0 | 97 | 5.1 | >10 |

The data above show the unexpected result that hydrothermal treatment of feedstocks containing dissolved zirconium acetate resulted in non-aggregated $ZrO_2$ particles at high concentration but aggregation at low concentration. The X-ray data (Table 3) confirm that all concentrations resulted in zirconia crystals in the 6 to 10 nm range. All concentrations with yttrium (4 weight percent oxide) also resulted in over 80 percent of the zirconia being in the cubic/tetragonal phase.

The X-ray data show that both the examples and the comparative examples have similar crystallite sizes (primary particle size). The XRD scan for Example 1 is shown in FIG. 3. The degree of aggregation in the low concentration comparative examples was confirmed by the appearance of the sol (Table 1). The comparative examples were cloudy and white due to the large aggregate size. Comparative Examples 1, 2 and 3 also have a significant amount of solids settling, again due to large aggregate size. Table 2 shows that the Z-average particle size is much higher for Comparative Examples 1, 2, and 3 than the examples made at a higher solids concentration. The aggregation can be further seen in the particle size distributions shown in FIG. 2. The volume average distribution clearly shows the aggregation for Comparative Examples 1 (squares) compared to Example 1 (diamonds).

Example 7A to 7D

Zirconia-containing sols were made with different levels of sodium. The feedstock used in Example 5 was spiked with various amounts of NaCl. The NaCl was dissolved with DI water to prepare a solution with 2.5 weight percent solids. The amount of added 2.5 weight percent NaCl solution can be found in Table 4. The sodium content of Example 5 was measured by Inductively Coupled Plasma Atomic Emission Spectroscopy (ICP). The sodium content of Examples 7A to 7D was calculated based on the amount of sodium added. The sodium content was expressed as the milligrams of sodium divided by the grams of zirconium in each example. The ICP detection limit is 0.023 milligram of sodium per gram of zirconium.

The feedstock for the hydrothermal reactions contained 15 weight percent solids (6.66 weight percent Zr, 0.295 weight percent Y). The zirconia-containing sols were made using a procedure similar to Example 5, with the charges given in Table 4 below, at a temperature of 207° C. and using a 35 min residence time in Hydrothermal Reactor B.

TABLE 4

Reaction Conditions for Runs at Different Levels of Sodium Ion

| Example | Zirconium acetate solution A (grams) | Yttrium acetate (grams) | DI water (grams) | Weight of NaCl solution added (2.5 wt-%) (grams) | milligrams sodium ÷ grams zirconium |
|---|---|---|---|---|---|
| Ex 5 | 900 | 24.2 | 1294 | 0 | 0.276 |
| Ex 7A | 900 | 24.2 | 1294 | 4.65 | 0.583 |
| Ex 7B | 900 | 24.2 | 1294 | 9.3 | 0.889 |
| Ex 7C | 900 | 24.2 | 1294 | 18.6 | 1.503 |
| Ex 7D | 900 | 24.2 | 1294 | 27.9 | 2.116 |

The resulting zirconia-containing sols (summarized in Table 5) showed that the particle size increased with the amount of sodium cation added to the feedstock before heating. The clarity of the aqueous sol is also affected by the addition of sodium cation to the feedstock. Lower sodium levels lead to higher clarity.

TABLE 5

Particle characterization

| Example | milligrams sodium ÷ grams zirconium | Z-Average Size (nm) | Poly-dispersity Index | Volume Average Size (nm) |
|---|---|---|---|---|
| Ex 5 | 0.276 | 13.7 | 0.347 | 5.73 |
| Ex 7A | 0.583 | 13.9 | 0.344 | 6.81 |
| Ex 7B | 0.889 | 15.3 | 0.280 | 7.72 |
| Ex 7C | 1.503 | 17.9 | 0.276 | 9.85 |
| Ex 7D | 2.116 | 20.8 | 0.279 | 12.2 |

Example 8A to 8E

The zirconia-containing sols obtained in Examples 5 and 7 (Ex 5, Ex 7A, Ex 7B, Ex 7C, and Ex 7D) were concentrated to 40.5 weight percent zirconia via rotary evaporation (28.78 weight percent Zr, 1.27 weight percent Y). The zirconia particles were surface treated and incorporated into a curable resin at 53 weight percent ZrO2 as described for Ex 8A to 8E below.

Example 8A was prepared from Example 5. The zirconia-containing sol concentrated from Example 5 (50.01 grams, 41.89 weight percent ZrO2), MEEAA (2.46 grams), and 1-methoxy-2-propanol (35 grams) were charged into a 500 mL round-bottom flask in that order. HEAP from Preparative Example 1 (4.26 grams at 50 weight percent HEAP in 1-methoxy-2-propanol), maleic acid (0.067 grams), and 1-methoxy-2-propanol (6.01 grams) were mixed together and heated to dissolve the maleic acid. This solution was then charged to the above flask. PROSTABB 5198 (0.29 grams at 5 weight percent in DI water) and Resin 1 (13.98 grams with a refractive index of 1.535) were then charged to the flask. The volatiles were removed via rotary evaporation to yield a curable acrylate resin mixture containing approximately 53 weight percent ZrO2.

Samples 8B through 8E were made in the same manner beginning with zirconia-containing sols of Examples 7A through 7D respectively. For each sol, the sodium content was as noted above and the viscosity of the resin mixture was measured using the Bubble Time Method.

Table 6 shows the refractive index for Examples 8A to 8E. The refractive index increased from 1.535 for the unfilled resin (i.e., no zirconia) to approximately 1.645 for the filled resins (i.e., containing zirconia). Table 6 also shows that the viscosity of the ZrO2 resin dispersion is dependant on the amount of sodium cation in the feedstock. That is, the viscosity increased with the concentration of sodium cation.

TABLE 6

Effect of Feedstock Sodium Content on Viscosity of ZrO2 resin dispersion

| Example | milligrams sodium ÷ grams zirconium | Refractive Index | Bubble time | Relative Viscosity |
|---|---|---|---|---|
| Ex 8A | 0.276 | 1.6455 | 6.54 | 1 |
| Ex 8B | 0.583 | 1.6450 | 8.62 | 1.318 |
| Ex 8C | 0.889 | 1.6462 | 11.86 | 1.813 |
| Ex 8D | 1.503 | 1.6448 | 34.61 | 5.292 |
| Ex 8E | 2.116 | 1.6430 | 85 | 12.997 |

Example 9A to 9D

Zirconia-containing sols were made with different levels of calcium. The feedstock used in Example 5 was spiked with various amounts of CaCl2. The CaCl2 was dissolved with DI water to prepare a solution with 2.5 weight percent solids. The amounts of added 2.5 weight percent CaCl2 solution can be found in Table 7.

The reactions in the hydrothermal reactor were run with a feedstock that contained 15 weight percent solids (6.66 weight percent Zr, 0.295 weight percent Y). The zirconia-containing sols were made using a procedure similar to Example 5, with the charges given in Table 7 below, at a temperature of 207° C. and using a 35 min residence time in Hydrothermal Reactor B. The calcium content of Example 9A was measured by ICP but was below the detection limit of 0.052 milligrams calcium per gram of zirconium. This amount is reported as zero in Table 7. The calcium content of each Examples 9B to 9D was calculated based on the amount that was added.

TABLE 7

Reaction Conditions for Runs at Different Levels of Calcium

| Example | Zirconium Acetate Solution (grams) | Yttrium Acetate (grams) | DI water (grams) | Weight of CaCl2 solution added (2.5 wt-%) (grams) | milligrams calcium ÷ grams zirconium |
|---|---|---|---|---|---|
| Ex 9A | 900 | 24.2 | 1294 | 0 | 0 |
| Ex 9B | 900 | 24.2 | 1294 | 6.61 | 0.306 |
| Ex 9C | 900 | 24.2 | 1294 | 13.23 | 0.613 |
| Ex 9D | 900 | 24.2 | 1294 | 39.7 | 1.840 |

The resulting sols showed larger particle size with increasing amounts of calcium cation added to the feedstock before heating (Table 8). The viscosity and the clarity of the aqueous sol are also affected by the addition of calcium cation to the feedstock. Lower calcium levels lead to lower aqueous viscosity and higher clarity.

TABLE 8

Particle Characterization

| Example | milligrams calcium ÷ grams zirconium | Z-Average Size (nm) | Poly-dispersity Index | Volume Average Size (nm) |
|---|---|---|---|---|
| Ex 9A | 0 | 13.7 | 0.347 | 5.73 |
| Ex 9B | 0.306 | 13.9 | 0.332 | 6.39 |
| Ex 9C | 0.613 | 15.2 | 0.273 | 7.84 |
| Ex 9D | 1.840 | 20.3 | 0.260 | 11.3 |

Example 10A to 10D

The zirconia-containing sols of Examples 9A to 9D were concentrated to 40.5 weight percent zirconia via rotary evaporation (28.78 weight percent Zr, 1.27 weight percent Y). The zirconia particles were surface treated and incorporated into a curable resin at 53 weight percent ZrO2 as described for Examples 10A to 10D below.

Example 10A was prepared from Example 5. The zirconia-containing sol concentrated from Example 5 (50.01 grams at 41.89 weight percent ZrO2), MEEAA (2.46 grams), and 1-methoxy-2-propanol (35 grams) were charged to a 500 mL round-bottom flask in that order. HEAP from Preparative Example 1 (4.26 grams at 50 weight percent in 1-methoxy-2-propanol), maleic acid (0.067 grams), and 1-methoxy-2-propanol (6.01 grams) were mixed together and heated to dissolve the maleic acid. This solution was then charged to the above flask. PROSTABB 5198 (0.29 grams at 5 weight percent in DI water) and Resin 1 (13.98 grams with a refractive index of 1.535) were then charged to the flask. The volatiles were removed via rotary evaporation to yield a curable acrylate resin mixture containing approximately 53 weight percent $ZrO_2$.

Samples 10B through 10D were made in the same manner beginning with the zirconia-containing sols of Examples 9B through 9D respectively. The viscosity of the resin mixture was measured using the Bubble Time Method.

Table 9 shows that the refractive index for all the samples increased from 1.535 for the unfilled resin to approximately 1.645 for the filled systems. Table 9 also shows that the viscosity of the $ZrO_2$ resin dispersion was dependant on the amount of calcium cation in the feedstock.

TABLE 9

Effect of Feedstock Calcium Content on Viscosity of $ZrO_2$ resin dispersion

| Example | milligrams calcium ÷ grams zirconium | Bubble time | Relative Viscosity | Refractive Index |
|---|---|---|---|---|
| Ex 10A | 0 | 6.54 | 1 | 1.6455 |
| Ex 10B | 0.306 | 8.15 | 1.246 | 1.6456 |
| Ex 10C | 0.613 | 11.9 | 1.819 | 1.6450 |
| Ex 10D | 1.840 | 166 | 25.38 | 1.6448 |

Example 11A to 11C and 11A-IER to 11C-IER

Example 11A was prepared without ion exchange treatment using zirconium acetate solution B. DI water (1213 grams) was charged to zirconium acetate solution B (900 grams) to give a 15 weight percent solids feedstock. Yttrium acetate (24.03 grams) was added and the mixture stirred for approximately 12 hours. The solution was pumped at a rate of 13.77 mL/min through Hydrothermal Reactor B. The tubular reactor was immersed in a bath of oil heated to 206° C. A clear, crystalline-ZrO2 sol was produced.

Example 11A-IER was prepared with ion exchange treatment using zirconium acetate solution B. DI water (1000 grams) was charged to zirconium acetate solution B (900 grams). Ion exchange resin (AMBERLITE IR120 in hydrogen form) (25 grams) was added. This mixture was stirred over night. The Ion exchange resin was removed via filtration. Yttrium acetate (24.21 grams) and DI water (285 grams) was added and the mixture stirred for about 12 hours. The solution was pumped at a rate of 13.77 mL/min through Hydrothermal Reactor B. The tubular reactor was immersed in a bath of oil heated to 206° C. A clear, crystalline-$ZrO_2$ sol resulted.

Similar procedures were used for Examples 11B and 11B-IER starting with zirconium acetate solution C and for Examples 11C and 11C-IER starting with zirconium acetate solution A. The data are given in Table 10 below. ICP was used to determine the amount of sodium and calcium in each feedstock. Table 10 shows that the ion exchange resin removes the sodium and calcium ions. It also shows that the particle size of the resultant sol is diminished when ion exchange is used to prepare feedstocks from zirconium acetate solutions B and C. It should be noted that zirconium solution A did not have a high amount of impurities to start with and therefore not much of a difference is expected.

TABLE 10

Effect of calcium and sodium on size

| Example | ZrAc Solution | milligrams sodium ÷ grams zirconium | milligrams calcium ÷ grams zirconium | Z-Average Size (mm) | Polydispersity Index | Volume Average Size (mm) |
|---|---|---|---|---|---|---|
| Ex 11A | B | 2.106 | <0.052 | 23.9 | 0.266 | 13.2 |
| Ex 11A-IER | B | <0.023 | <0.052 | 13.7 | 0.283 | 6.12 |
| Ex 11B | C | 0.973 | 0.267 | 21.7 | 0.281 | 11.1 |
| Ex 11B-IER | C | <0.023 | <0.052 | 13.8 | 0.373 | 5.45 |
| Ex 11C | A | 0.259 | <0.052 | 13.7 | 0.347 | 5.73 |
| Ex 11C-IER | A | <0.023 | <0.052 | | | |

Examples 12A to 12C and 12A-IER to 12C-IER

The zirconia-containing sols of Example 11A, 11A-IER, 11B, 11B-IER, 11C, and 11C-IER were concentrated to 40.5 weight percent zirconia via rotary evaporation. The zirconia particles were surface treated and incorporated into a curable resin at 53 weight percent ZrO2 as described below.

Example 12A was prepared from Example 11A. The $ZrO_2$ sol concentrated from Example 11A (50.06 grams at 42.14 weight percent $ZrO_2$), MEEAA (2.48 grams), and 1-methoxy-2-propanol (35 grams) were charged to a 500 mL round bottom flask in that order. HEAP from Preparative Example 1 (4.29 grams at 50 weight percent in 1-methoxy-2-propanol), maleic acid (0.067 grams), and 1-methoxy-2-propanol (6.01 grams) were mixed together and heated to dissolve the maleic acid. This solution was then charged to the above flask. PROSTABB 5198 (0.30 grams at 5 weight percent in DI water) and Resin 1 (14.01 grams) were then charged to the flask. The volatiles were removed via rotary evaporation to yield a filled curable acrylate resin mixture that contained approximately 53 weight percent $ZrO_2$.

Examples 12A-IER, 12B, 12B-IER, 12C, and 12C-IER were prepared using an identical procedure from Examples 11A-IER, 11B, 11B-IER, 11C, and 11C-IER, respectively.

Table 11 shows that the refractive index for all the resin dispersions increases from 1.535 for the unfilled resin to approximately 1.645 for the filled systems. The viscosity was measured via the bubble time method described above. The viscosity of the $ZrO_2$ resin dispersion can be lowered significantly by removal of sodium and calcium cations from the feedstock by means of an ion exchange resin before making the sol.

TABLE 11

Effect of sodium and calcium on relative viscosity and refractive index

| Example | ZrAc Solution | Bubble time | Relative Viscosity | Refractive Index |
|---|---|---|---|---|
| Ex 12A | B | 74 | 12 | 1.6365 |
| Ex 12A -IER | B | 6.61 | 1 | 1.6455 |
| Ex 12B | C | 105 | 16 | 1.6444 |
| Ex 12B -IER | C | 7.73 | 1 | 1.644 |
| Ex 12C | A | 6.54 | 1 | 1.6455 |
| Ex 12C -IER | A | 6.41 | 1 | 1.6451 |

Examples 13A to 13C

Example 13A was prepared as described in Example 5. Sodium chloride was added to portions of Example 13A to prepare Example 13B and sodium nitrate was added to portions of Example 13A to prepare Example 13C. The particle size was measured using Photon Correlation Spectroscopy. As noted in Table 12, the presence of sodium ions does not affect the particle size of the sol.

TABLE 12

Effect of sodium addition to zirconia sol on the particle size

| Example | milligrams sodium ÷ grams zirconium | Z-Average Size (nm) | Volume Average Size (nm) |
|---|---|---|---|
| Ex 13A |  | 15.5 | 5.08 |
| Ex 13B | 1.849 | 15.6 | 6.27 |
| Ex 13C | 1.849 | 15.7 | 6.13 |

Examples 14A and 14B

Example 13A was concentrated to 41.04 weight percent zirconia via rotary evaporation to provide Example 14A. Sodium chloride was added to one portion of this sol to provide Example 14B. The zirconia particles in both portions of the sol were surface treated and incorporated into a curable resin at 53 weight percent $ZrO_2$.

Example 14A was prepared from Example 13A without the addition of more sodium chloride. The zirconia-containing sol of Example 13A (50.01 grams at 41.04 weight percent $ZrO_2$), MEEAA (2.42 grams), and 1-methoxy-2-propanol (35.07 grams) were charged to a 500 mL round bottom flask in that order. HEAP from Preparatory Example 1 (4.18 grams at 50 weight percent in 1-methoxy-2-propanol), maleic acid (0.065 grams), and 1-methoxy-2-propanol (6.07 grams) were mixed together and heated to dissolve the maleic acid. This mixture was then charged to the above flask. PROSTABB 5198 (0.29 grams at 5 weight percent in DI water) and Resin 1 (13.64 gram) were then charged to the flask. The volatiles were removed via rotary evaporation to yield a filled curable acrylate resin mixture containing approximately 53 weight percent $ZrO_2$.

Example 14B was prepared from Example 13A with the addition of more sodium chloride. The zirconia-containing sol of Example 13A (200 grams at 41.04 weight percent $ZrO_2$) and NaCl (11.48 grams of a 2.5 weight percent solution) were mixed together. This spiked zirconia-containing sol (50.01 g at 38.81 weight percent $ZrO_2$), MEEAA (2.29 grams) and 1-methoxy-2-propanol (35.4 grams) were charged to a 500 mL RB flask in that order. HEAP from Preparatory Example 1 (3.95 grams at 50 weight percent in 1-methoxy-2-propanol), maleic Acid (0.0618 grams), and 1-methoxy-2-propanol (6.0 grams) were mixed together and heated to dissolve the maleic acid. This mixture was then charged to the above flask. PROSTABB 5198 (0.28 grams at 5 weight percent in DI water) and Resin 1 (12.90) were then charged to the flask. The volatiles were removed via rotary evaporation to yield a filled curable acrylate resin mixture containing approximately 53 weight percent $ZrO_2$.

The viscosities of Examples 14A and 14B were measured using the bubble time method. The results in Table 13 show that addition of sodium ion to a finished sol does not affect the resin viscosity.

TABLE 13

Effect of sodium addition to zirconia sol on the relative viscosity and refractive index of composite material

| Example | milligrams sodium ÷ grams zirconium | Bubble time | Relative Viscosity | Refractive Index |
|---|---|---|---|---|
| Ex 14A |  | 5.8 | 1 | 1.6455 |
| Ex 14B | 1.849 | 6.26 | 1 | 1.64602 |

Examples 15A to 15B and Comparative Examples 15A to 15D

Six feedstock solutions were prepared using three different zirconium sources. Example 15A was prepared by diluting zirconium acetate solution A (16.3 weight percent zirconium) with DI water to prepare a feedstock that contained 5.32 weight percent Zr. Yttrium acetate was added in an amount so that the final zirconia would contain about 4 weight percent yttrium oxide.

Example 15B was prepared by diluting zirconium acetate solution A (16.3 weight percent zirconium) with DI water to prepare a feedstock that contained 1.10 weight percent Zr. Yttrium acetate was added in an amount so that the final zirconia would contain about 4 weight percent yttrium oxide.

Comparative Example 15A was prepared by diluting a solution of zirconium dichloride oxide octahydrate (25 weight percent zirconium) and yttrium acetate with DI water to prepare a feedstock that contained 5.32 weight percent Zr. Yttrium acetate was added in an amount so that the final zirconia would contain about 4 weight percent yttrium oxide. Comparative Example 15B was prepared by diluting a solution of zirconium dichloride oxide octahydrate (25 weight percent zirconium) and yttrium acetate with DI water to prepare a feedstock that contained 1.10 weight percent Zr. Yttrium acetate was added in an amount so that the final zirconia would contain about 4 weight percent yttrium oxide.

Comparative Example 15C was prepared by diluting a solution of zirconium oxynitrate (31.78 weight percent zirconium) and yttrium acetate with DI water to prepare a feedstock that contained 5.32 weight percent Zr. Yttrium acetate was added in an amount so that the final zirconia would contain about 4 weight percent yttrium oxide.

Comparative Example 15D was prepared by diluting a solution of zirconium oxynitrate (31.78 weight percent zirconium) and yttrium acetate with DI water to prepare a feedstock that contained 1.10 weight percent Zr. Yttrium acetate was added in an amount so that the final zirconia would contain about 4 weight percent yttrium oxide.

Each of the feedstocks was placed into a general purpose acid digestion bomb with a Teflon cup (Parr Model number 4749). The acid digestion bombs were placed in a forced air oven at a temperature of 200° C. for 4 hr. They were then cooled and opened. Only the high concentration acetate sol (Example 15) resulted in a clear sol. The chloride and nitrate sols yield milky materials and yielded no tetragonal phase.

The compositions of these examples are summarized in Table 14 and the XRD data is summarized in Table 15.

TABLE 14

Summary of Example 15-16 and Comparative Examples 15A-15D

| Example | Counter ion | Feedstock (grams) | Added Yttrium Acetate (grams) | DI Water (grams) | Weight percent Zr |
|---|---|---|---|---|---|
| Ex 15A | Acetate | 32.09 g | 0.86 | 67.05 | 5.32 |
| Ex 1B | Acetate | 6.68 | 0.179 | 93.14 | 1.10 |
| CEx 15A | Chloride | 21.21 | 0.86 | 77.93 | 5.32 |
| CEx 15B | Chloride | 4.42 | 0.179 | 95.401 | 1.10 |
| CEx 15C | Nitrate | 16.76 | 0.86 | 82.38 | 5.32 |
| CEx 15D | Nitrate | 3.49 | 0.179 | 96.331 | 1.10 |

TABLE 15

Effect of the anion of the zirconium salt

| Example | Appearance | M Intensity | M size (nm) | C/T intensity | C/T size (nm) |
|---|---|---|---|---|---|
| Ex 15A | Clear sol | 23 | 4.0/7.5 | 100 | 12.5 |
| Ex 15B | Cloudy sol | | | | |
| CEx 15A | Milky sol | 100 | 3.0/4.5 | 0 | |
| CEx 15B | Milky sol | | | | |
| CEx 15C | Milky sol | 100 | 6.0/10.5 | 0 | |
| CEx 15D | Milky sol | | | | |

Example 16A to 16K and Comparative Examples 16A to 16C

The percent conversion of the feedstock was calculated based on thermogravimetric analysis as described above. The value of A, which corresponds to the percent weight loss of the feedstock, was 52.71 percent with a standard deviation of 1.12. The value of A is an average of 8 lots of zirconium acetate. The value of C, which corresponds to the percent weight loss of a zirconia-containing standard believed to be completely converted, was 8.71 percent. The value of B, which corresponds to the percent weight loss of the sample under analysis, is shown in Table 16 along with the calculation of the percent conversion for various examples and comparative examples described above. All of the examples and comparative examples are nearly 100 percent converted to zirconia-containing material.

TABLE 16

Percent conversion of feedstock to zirconia-containing nanoparticles.

| Example | ZrO2 Sample | Residue at 200° C. | Residue at 900° C. | B | Percent conversion |
|---|---|---|---|---|---|
| Ex 16A | Ex 1 | 97.99 | 90.14 | 8.71 | 100 |
| Ex 16B | Ex 2 | 97.92 | 90.38 | 8.34 | 100.83 |
| Ex 16C | Ex 3 | 97.98 | 90.97 | 7.70 | 102.27 |
| Ex 16D | Ex 4 | 97.75 | 89.97 | 8.65 | 100.14 |
| Ex 16E | Ex 6 | 98.43 | 89.99 | 9.37 | 98.48 |
| Ex 16F | Ex 7A | 98.36 | 90.65 | 8.51 | 100.46 |
| Ex 16G | Ex 9B | 98.01 | 90.31 | 8.53 | 100.4 |
| Ex 16H | Ex 9D | 98.02 | 90.35 | 8.49 | 100.50 |
| Ex 16I | Ex 11A | 97.77 | 89.88 | 8.78 | 99.84 |
| Ex 16J | Ex 11A-IER | 97.79 | 89.71 | 9.01 | 99.32 |
| Ex 16K | Ex 11B-IER | 97.95 | 89.89 | 8.97 | 99.41 |
| CEx 16A | CEx 1 | 98.03 | 90.93 | 7.808 | 102.04 |
| CEx 16B | CEx 2 | 97.89 | 91.23 | 7.30 | 103.2 |
| CEx 16C | CEx 3 | 96.99 | 88.31 | 9.83 | 97.45 |

Example 17

DI water (1929 grams) was mixed with zirconium acetate (solution A, 2100 grams). Yttrium acetate (56.49 grams) was added and the mixture was stirred for approximately 12 hours to prepare the 19 weight percent solids feedstock (8.44 weight percent Zr, 0.374 weight percent Y). The feedstock was pumped at a rate of 11.5 mL/min through Hydrothermal Reactor B. A clear, crystalline-$ZrO_2$ containing sol resulted.

The resultant sol was dialyzed against DI water for approximately 20 hours using a SPECTROPOR Membrane (MWCO 12-14,000), available from Spectrum Labs (Rancho Domoinqeus Calif.). The water was changed numerous times. This step removed excess acetic acid from the sol. The resulting sol was concentrated to 32.74 weight percent ZrO2 via rotary evaporation.

The concentrated sol (200 grams) was charged to a 16 ounce jar. SILQUEST A1230 (9.62 grams), 1-methoxy-2-propanol (225 grams), methacryloxypropyl trimethoxysilane (14.38 grams) and PROSTABB 5198 (0.25 grams of 5 weight percent solids in DI water) were added to sol in that order. The mixture was mixed and then the jar sealed and heated to 90° C. for 4 hours. The resultant mixture (446.53 grams) was charged to a 1000 ml round bottom flask and concentrated to 223.26 grams.

A 2000 mL beaker was charged with DI water (450 grams) and concentrated ammonia (7.05 g). The above surface modified ZrO2 sol was poured into the aqueous ammonia and stirred slowly for 10 minutes. This resulted in a white precipitate. The precipitate was isolated on a Buchner funnel (Whatman #4 filter paper). It was washed twice with 100 mL of DI water. The resultant damp solids (245 grams) were then dissolved in 1-methoxy-2-propanol (253 g). This mixture (453.6 grams) was concentrated to 207.6 grams via rotary evaporation. This yields a sol of 66.8 weight percent surface treated $ZrO_2$ particles.

A 100 mL round bottom flask was charged with the concentrated $ZrO_2$ sol (50 grams at 66.8 weight percent solids), hydroxyethyl methacrylate (15.6 grams) and SR 603 (6.7 grams). The solvent was removed via rotary evaporation and the sample was concentrated to 55.4 grams. The resulting sample was a translucent, low viscosity sol of silane treated $ZrO_2$ in a curable methacrylate resin. The refractive index of 1.564 is considerably higher than of the unfilled resin (1.4555).

What is claimed is:

1. A continuous hydrothermal reactor system comprising:
    a tubular reactor comprising a composite tube comprising (a) a metal sheath and (b) a fluorinated polymeric hose encased within the metal sheath, wherein the tubular reactor is coiled;
    a pump connected to a first end of the tubular reactor, wherein the pump continuously introduces a feedstock comprising an aqueous medium into the first end of the tubular reactor;
    a means of heating and controlling the temperature of the feedstock within the tubular reactor;
    a cooling device connected to a second end of the tubular reactor that is opposite the first end, wherein an effluent is continuously removed from the tubular reactor and passed through the cooling device; and
    a means of controlling pressure within the tubular reactor, said means of controlling pressure comprising a back-pressure valve connected to an exit of the cooling device, wherein pressure and temperature are selected to subject the feedstock to hydrothermal treatment conditions within the tubular reactor.

2. The continuous hydrothermal reactor system of claim 1, wherein the fluorinated polymeric hose comprises a fluorinated polyolefin.

3. The continuous hydrothermal reactor system of claim 1, wherein the fluorinated polymeric hose comprises polytetrafluoroethylene.

4. The continuous hydrothermal reactor system of claim 1, wherein the tubular reactor has an inner diameter in a range of 0.1 to 3.0 centimeters.

5. The continuous hydrothermal reactor system of claim 1, wherein the means of heating comprises a heating medium vessel containing a heating medium comprising an oil, sand, or salt, and wherein the tubular reactor is positioned in the heating medium.

6. The continuous hydrothermal reactor system of claim 5, wherein the heating medium is an oil.

7. The continuous hydrothermal reactor system of claim 5, wherein the heating medium heats the tubular reactor to a reactor temperature in a range of 170° C. to 275° C.

8. The continuous hydrothermal reactor of claim 1, wherein the pressure at the exit of the hydrothermal reactor is at least 200 pounds per square inch and the temperature within the tubular reactor is at least 170° C.

9. A continuous hydrothermal reactor system comprising:
    a tubular reactor comprising a composite tube comprising (a) a metal sheath that is braided and (b) a fluorinated polymeric hose encased within the metal sheath;
    a pump connected to a first end of the tubular reactor, wherein the pump continuously introduces a feedstock comprising an aqueous medium into the first end of the tubular reactor;
    a means of heating and controlling the temperature of the feedstock within the tubular reactor;
    a cooling device connected to a second end of the tubular reactor that is opposite the first end, wherein an effluent is continuously removed from the tubular reactor and passed through the cooling device; and
    a means of controlling pressure within the tubular reactor, said means of controlling pressure comprising a back-pressure valve connected to an exit of the cooling device, wherein pressure and temperature are selected to subject the feedstock to hydrothermal treatment conditions within the tubular reactor.

10. The continuous hydrothermal reactor system of claim 9, wherein the metal sheath comprises stainless steel.

11. The continuous hydrothermal reactor system of claim 9, wherein the fluorinated polymeric hose comprises a fluorinated polyolefin.

12. The continuous hydrothermal reactor system of claim 9, wherein the fluorinated polymeric hose comprises polytetrafluoroethylene.

13. The continuous hydrothermal reactor system of claim 9, wherein the tubular reactor has an inner diameter in a range of 0.1 to 3.0 centimeters.

14. The continuous hydrothermal reactor system of claim 9, wherein the means of heating comprises a heating medium vessel containing a heating medium comprising an oil, sand, or salt, and wherein the tubular reactor is positioned in the heating medium.

15. The continuous hydrothermal reactor system of claim 14, wherein the heating medium is an oil.

16. The continuous hydrothermal reactor system of claim 14, wherein the heating medium heats the tubular reactor to a reactor temperature in a range of 170° C. to 275° C.

17. The continuous hydrothermal reactor of claim 9, wherein the tubular reactor is coiled.

18. The continuous hydrothermal reactor of claim 9, wherein the pressure at the exit of the hydrothermal reactor is at least 200 pounds per square inch and the temperature within the tubular reactor is at least 170° C.

* * * * *

UNITED STATES PATENT AND TRADEMARK OFFICE
CERTIFICATE OF CORRECTION

PATENT NO. : 8,808,549 B2  
APPLICATION NO. : 14/069554  
DATED : August 19, 2014  
INVENTOR(S) : Brant Kolb et al.

Page 1 of 2

It is certified that error appears in the above-identified patent and that said Letters Patent is hereby corrected as shown below:

In the Specification

<u>Column 9</u>
Line 57, delete "autogeneous" and insert -- autogenous --, therefor.

<u>Column 23</u>
Line 40, delete "polyalkelyene" and insert -- polyalkylene --, therefor.

<u>Column 24</u>
Line 46, delete "hydroxylethyl" and insert -- hydroxyethyl --, therefor.

<u>Column 40</u>
Line 52, delete "Domoinqeus" and insert -- Dominguez --, therefor.

In the Claims

<u>Column 42</u>
Line 4, cancel the text beginning with "8. The continuous hydrothermal reactor of claim 1," to and ending "is at least 170° C." in column 42, line 7, and insert the following claim:

-- 8. The continuous hydrothermal reactor system of claim 1, wherein the pressure at the exit of the hydrothermal reactor is at least 200 pounds per square inch and the temperature within the tubular reactor is at least 170° C. --.

Signed and Sealed this  
Seventh Day of April, 2015

Michelle K. Lee  
*Director of the United States Patent and Trademark Office*

CERTIFICATE OF CORRECTION (continued)
U.S. Pat. No. 8,808,549 B2

Column 42 (continued)

Line 49, cancel the text beginning with "The continuous hydrothermai reactor of claim 9," to and ending "reactor is coiled." in column 42, line 50, and insert the following claim:

17. The continuous hydrothermal reactor system of claim 9, wherein the tubular reactor is coiled.

Line 51, cancel the text beginning with "The continuous hydrothermal reactor of claim 9," to and ending "reactor is at least 170° C." in column 42, line 54, and insert the following claim:

18. The continuous hydrothermal reactor system of claim 9, wherein the pressure at the exit of the hydrothermal reactor is at least 200 pounds per square inch and the temperature within the tubular reactor is at least 170° C.